(12) United States Patent
Nomura et al.

(10) Patent No.: US 6,456,445 B2
(45) Date of Patent: Sep. 24, 2002

(54) ZOOM LENS HAVING A CAM MECHANISM

(75) Inventors: Hiroshi Nomura, Saitama; Nobuaki Aoki, Tokyo; Yoshihiro Yamazaki, Saitama; Satoru Nakamura, Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/774,114

(22) Filed: Jan. 31, 2001

(30) Foreign Application Priority Data

Feb. 1, 2000 (JP) .......................................... 2000-23512

(51) Int. Cl.⁷ ........................ G02B 15/14; G02B 17/00; G02B 9/08
(52) U.S. Cl. ........................ 359/699; 359/700; 359/701; 359/823; 359/826; 396/462; 396/87; 396/79; 396/451
(58) Field of Search ................................. 359/694, 699, 359/700, 701, 704, 705, 706, 823, 824, 826; 396/72, 85, 87, 79, 451, 462

(56) References Cited

U.S. PATENT DOCUMENTS

| | | | | |
|---|---|---|---|---|
| 4,576,446 A | * | 3/1986 | Kamata | 359/699 |
| 4,993,815 A | * | 2/1991 | Yamazaki et al. | 359/823 |
| 5,218,479 A | * | 6/1993 | Chiou et al. | 359/700 |
| 5,313,329 A | | 5/1994 | Ueda | 359/676 |
| 5,488,513 A | * | 1/1996 | Tanaka | 359/699 |
| 5,589,987 A | | 12/1996 | Tanaka | 359/701 |
| 5,812,889 A | | 9/1998 | Nomura et al. | 396/87 |
| 5,818,647 A | * | 10/1998 | Nishio et al. | 359/700 |
| 6,014,269 A | | 1/2000 | Nomura et al. | 359/701 |
| 6,049,432 A | * | 4/2000 | Machida et al. | 359/700 |
| 6,115,191 A | * | 9/2000 | Ito et al. | 359/699 |
| 6,195,212 B1 | * | 2/2001 | Miyamoto | 359/699 |

* cited by examiner

Primary Examiner—Loha Ben
(74) Attorney, Agent, or Firm—Greenblum & Bernstein, P.L.C.

(57) ABSTRACT

A zoom lens includes a cam barrel having first and second cam grooves formed on an inner peripheral surface thereof; and first and second lens frames having first and second cam followers, respectively engaged with the first and the second cam grooves. The cam dead end of the first cam groove and the second cam follower insertion opening of the second cam groove are formed at the same circumferential position. Upon assembly, the first cam follower is inserted into the first leading section via a first cam follower insertion opening, and the second cam follower is inserted into the second leading section via a second cam follower insertion opening.

28 Claims, 18 Drawing Sheets

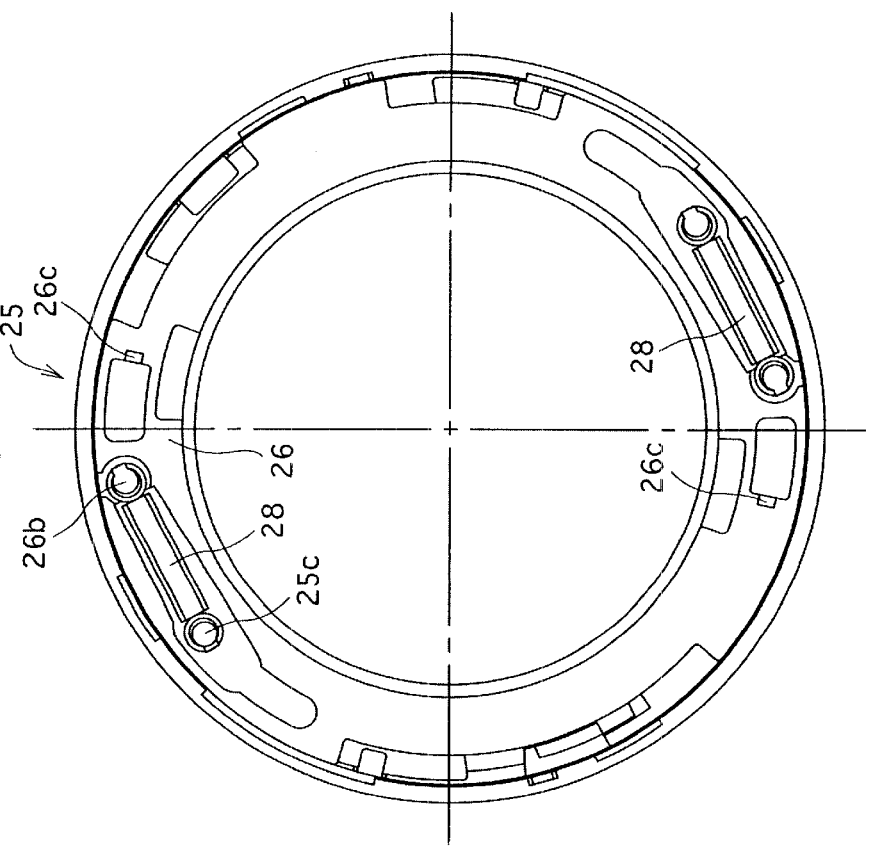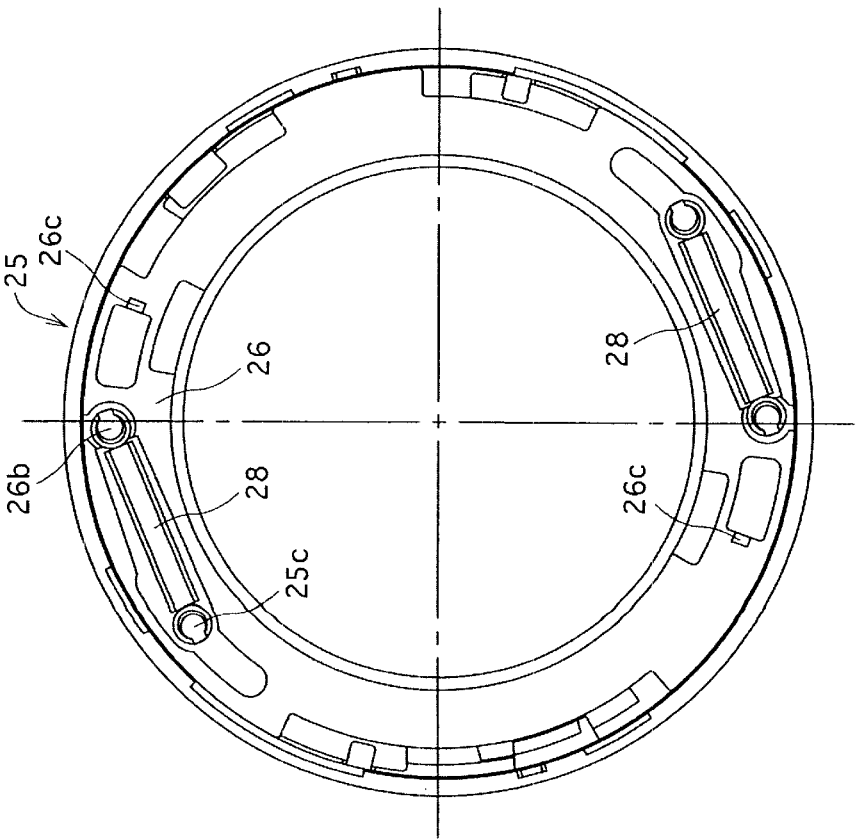

ZOOM LENS HAVING A CAM MECHANISM

BACKGROUND OF THE INVENTION

1. Field of the Invention

The present invention relates to a zoom lens, or a zoom lens barrel, which is provided with a cam mechanism for moving movable lens groups in the direction of the optical axis of the photographic optical system in a predetermined manner to obtain a continuously variable focal length upon zooming.

2. Description of the Related Art

A zoom lens having a cam mechanism for moving one or more movable lens groups which are guided in the direction of the optical axis of the photographic optical system (i.e., in the optical axis direction) without rotating about the optical axis in a predetermined manner by rotation of a cam barrel having cam grooves to obtain a continuously variable focal length is known in the art. In a typical cam mechanism of this type using cam grooves, the lens frame of each movable lens group is guided in the optical axis direction without rotating about the optical axis with the use of linear guide grooves which are formed on a linear guide barrel. This linear guide barrel is coupled to the cam barrel to be immovable in the optical axis direction relative to the cam barrel but rotatable about the optical axis relative to the cam barrel. When the lens frame of each movable lens group is inserted into the cam barrel so that the cam followers of the lens frame are respectively fitted in the corresponding cam grooves of the cam barrel, the lens frame is inserted into the cam barrel in a state wherein the end openings (the cam follower insertion openings) of the cam grooves of the cam barrel are positioned in alignment with the cam followers of the lens frame in the optical axis direction, respectively, while the linear guide grooves of the linear guide barrel are positioned in alignment with the linear guide projections formed on the lens frame in the optical axis direction, respectively. Therefore, in the case where two or more lens frames are supported by the cam barrel and the linear guide barrel therein, it is necessary to maintain accurate alignment between the cam barrel and the linear guide barrel in a circumferential direction every time before each lens frame is inserted into the cam barrel. This operation is troublesome and time-consuming.

SUMMARY OF THE INVENTION

The present invention has been devised in view of the above-mentioned problem, and accordingly, an object of the present invention is to provide a zoom lens having a cam mechanism which makes it easy to couple more than one lens frame to the cam barrel.

To achieve the object mentioned above, according to an aspect of the present invention, a zoom lens is provided, including a cam barrel driven to rotate about an optical axis; a first cam groove and second cam groove formed on an inner peripheral surface of the cam barrel, the first cam groove and second cam groove having different profiles;-a first lens frame having a first cam follower which is engaged with the first cam groove; and a second lens frame having a second cam follower which is engaged with the second cam groove. The first cam groove includes a first zoom section for moving the first lens frame between a telephoto position thereof and a wide-angle position thereof in accordance with a rotation of the cam barrel; a first leading section for leading the first cam follower from a first cam follower insertion opening, which is open at an end of the cam barrel, to the first zoom section; and a cam dead end positioned on the opposite side of the first zoom section with respect to the first leading section, wherein the first cam follower does not enter the cam dead end during operation of the zoom lens. The second cam groove includes a second zoom section for moving the second lens frame between a telephoto position thereof and a wide-angle position thereof in accordance with the rotation of the cam barrel; and a second leading section for leading the second cam follower from a second cam follower insertion opening, which is open at an end of the cam barrel, to the second zoom section. The cam dead end of the first cam groove and the second cam follower insertion opening of the second cam groove are formed at the same circumferential position in a circumferential direction of the cam barrel. Upon assembly of the first lens frame and the second lens frame to the cam barrel, the first cam follower is inserted into the first leading section via the first cam follower insertion opening, and subsequently, the second cam follower is inserted into the second leading section via the second cam follower insertion opening.

Preferably, the first cam follower, the second cam follower, the first cam groove, and the second cam groove respectively include a plurality of first cam followers, a plurality of second cam followers, a plurality of first cam grooves, and a plurality of second cam grooves, respectively provided at an equi-angular distance.

In an embodiment, the zoom lens further includes a linear guide barrel which is positioned inside the cam barrel so as to guide the first lens frame and second lens frame in the optical axis direction, the linear barrel including a linear guide slot extending parallel to the optical axis. The first lens frame includes a first guide projection and the second lens frame includes a second guide projection, the first guide projection and the second guide projection being engaged with the linear guide slot at different locations therein with respect to the direction of the optical axis. The first guide projection is formed on the first lens frame at the same circumferential position as the first cam followers. The second guide projections are formed on the second lens frame at the same circumferential position as the second cam followers. The first cam follower passes through the linear guide slot to be fitted in the first cam groove; and the second cam follower passes through the linear guide slot to be fitted in the second cam groove.

Preferably, the first lens frame includes a first resilient extending piece which extends in the direction of the optical axis to be elastically deformable in an inward radial direction; and the first guide projection is formed on the first resilient extending piece to extend radially outwards to be engaged with the linear guide slot; the first cam follower is fixed to the first guide projection to extend radially outwards to be engaged with the first cam groove via the linear guide slot; the second lens frame includes a second resilient extending piece which extends in the direction of the optical axis to be elastically deformable in an inward radial direction; the second guide projection is formed on the second resilient extending piece to extend radially outwards to be engaged with the linear guide slot; and the second cam follower is fixed to the second guide projection to extend radially outwards to be engaged with the second cam groove via the linear guide slot.

Preferably, the linear guide slot includes a plurality of linear guide slots, the first guide projection and second guide projection respectively include a plurality of first guide projections and a plurality of second guide projections, respectively equal to the number of the plurality of linear guide slots, and each of the first guide projections and corresponding one of the second guide projections are engaged with a common linear guide slot of the linear guide slots.

In an embodiment, the first cam groove further includes a first accommodation section positioned between the first zoom section and the first leading section. The second cam groove further includes a second accommodation section formed on the opposite side of the second zoom section with respect to the second leading section; and the first accommodation section and the second accommodation section are positioned in the same range in a circumferential direction of the cam barrel.

Preferably, the second cam groove further includes a stop section, wherein the depth of the stop section is smaller than the depth of the second zoom section in a radial direction of the cam barrel. The stop section is positioned in the middle of the second leading section to prevent the second cam follower from moving beyond the stop section, toward the cam follower insertion opening, when the second cam follower is fitted in the second cam groove.

Preferably, the linear guide barrel and the cam barrel are connected to each other to be relatively immovable in the direction of the optical axis and relatively rotatable about the optical axis.

According to another aspect of the present invention, a zoom lens is provided, including a cam barrel driven to rotate about an optical axis; a first cam groove and second cam groove formed on an inner peripheral surface of the cam barrel, the first cam groove and second cam groove having different profiles; a first lens frame having a first cam follower which is engaged with the first cam groove; a second lens frame having a second cam follower which is engaged with the second cam groove; and a linear guide barrel which is associated with the first lens frame and the second lens frame so as to guide the first lens frame and the second lens frame in a direction of the optical axis. The first cam groove includes a first zoom section for moving the first lens frame between a telephoto position thereof and a wide-angle position thereof in accordance with a rotation of the cam barrel; a first leading section for leading the first cam follower from a first cam follower insertion opening, which is open at an end of the cam barrel, to the first zoom section; and a cam dead end positioned on the opposite side of the first zoom section with respect to the first leading section, wherein the first cam follower does not enter the cam dead end during operation of the zoom lens. The second cam groove includes a second zoom section for moving the second lens frame between a telephoto position thereof and a wide-angle position thereof in accordance with the rotation of the cam barrel; and a second leading section for leading the second cam follower from a second cam follower insertion opening, which is open at an end of the cam barrel, to the second zoom section. The cam dead end of the first cam groove and the second cam follower insertion opening of the second cam groove are formed at the same circumferential position in a circumferential direction of the cam barrel. Upon assembly of the first lens frame and the second lens frame to the cam barrel and the linear guide barrel, the first cam follower is inserted into the first leading section via the first cam follower insertion opening, the linear guide barrel and the cam barrel are rotated relative to each other until the first cam follower reaches the cam dead end of the first cam groove, and subsequently, the second cam follower is inserted into the second leading section via the second cam follower insertion opening.

According to another aspect of the present invention, a zoom lens is provided, including a cam barrel driven to rotate about an optical axis; a first cam groove and a second cam groove formed on an inner peripheral surface of the cam barrel, the first cam groove and second cam groove having different profiles; a first lens frame having a first cam follower which is engaged with the first cam groove; a second lens frame having a second cam follower which is engaged with the second cam groove; and a linear guide barrel which is associated with the first lens frame and the second lens frame so as to guide the first lens frame and the second lens frame in a direction of the optical axis. The linear guide barrel is positioned inside the cam barrel and includes a linear guide slot extending parallel to the optical axis. The first lens frame includes a first guide projection which is engaged with the linear guide slot, and the second lens frame includes a second guide projection which is engaged with the linear guide slot. The first cam groove includes a first zoom section for moving the first lens frame between a telephoto position thereof and a wide-angle position thereof in accordance with a rotation of the cam barrel; a first leading section for leading the first cam follower from a first cam follower insertion opening, which is open at an end of the cam barrel, to the first zoom section; and a cam dead end positioned on the opposite side of the first zoom section with respect to the first leading section, wherein the first cam follower does not enter the cam dead end during operation of the zoom lens. The second cam groove includes a second zoom section for moving the second lens frame between a telephoto position thereof and a wide-angle position thereof in accordance with the rotation of the cam barrel; and a second leading section for leading the second cam follower from a second cam follower insertion opening, which is open at an end of the cam barrel, to the second zoom section. The second cam follower insertion opening and the linear guide slot are positioned to correspond to the second cam follower and the second guide projection, respectively, in a circumferential direction, when the first cam follower is positioned at the cam dead ends of the first cam grooves.

Preferably, the cam dead end and the second cam follower insertion opening are formed at the same circumferential position in a circumferential direction of the cam barrel.

Preferably, the linear guide slot is formed to penetrate through the linear guide barrel radially, wherein the first guide projection and the second guide projection are engaged with a linear guide slot at different locations therein in the direction of the optical axis; the first guide projection is formed on the first lens frame at the same circumferential position as the first cam follower; the second guide projection is formed on the second lens frame at the same circumferential position as the second cam follower; the first cam follower is fitted in the first cam groove via the linear guide slot; and the second cam follower is fitted in the second cam groove via the linear guide slot.

In an embodiment, the first lens frame includes a first resilient extending piece which extends in the direction of the optical axis to be elastically deformable radially inwards, wherein the first guide projection is formed on the first resilient extending piece to extend radially outwards to be engaged with the linear guide slot, and the first cam follower is fixed to the first guide projection to extend radially outwards to be engaged with the first cam groove via the linear guide slots. The second lens frame includes a second resilient extending piece which extends in the direction of the optical axis to be elastically deformable radially inwards, wherein the second guide projection is formed on the second resilient extending piece to extend radially outwards to be engaged with the linear guide slot, and the second cam follower is fixed to the second guide projection to extend radially outwards to be engaged with the second cam groove via the linear guide slot.

In an embodiment, the first cam groove further includes a first accommodation section positioned between the first zoom section and the first leading section, and the second cam groove further includes a second accommodation section formed on the opposite side of the second zoom section with respect to the second leading section. The first accommodation section and the second accommodation section are positioned in the same range in a circumferential direction of the cam barrel.

In an embodiment, the second cam groove further includes a stop section, the depth thereof being smaller than the depth of the second zoom section in a radial direction of the cam barrel. The stop section is positioned in the middle of the second leading section to prevent the second cam follower from moving toward the cam follower insertion opening beyond the stop section when the second cam follower is fitted in the second cam groove.

Preferably, each of the first cam follower, second cam follower, first cam groove, and second cam groove includes a plurality of first cam followers, second cam followers, first cam grooves, and second cam grooves, respectively provided at an equi-angular distance.

Preferably, the linear guide slot includes a plurality of linear guide slots, the first guide projection and second guide projection respectively include a plurality of first guide projections and a plurality of second guide projections, respectively equal to the number of the plurality of linear guide slots, and each of the first guide projections and corresponding one of the second guide projections are engaged with a common linear guide slot of the linear guide slots.

According to another aspect of the present invention, a zoom lens is provided, including a cam barrel driven to rotate about an optical axis; a first cam groove and second cam groove formed on an inner peripheral surface of the cam barrel, the first cam groove and second cam groove having different profiles each other; a first lens frame having first a cam follower which is engaged with the first cam groove; a second lens frame having a second cam follower which is engaged with the second cam groove; and a linear guide barrel which is associated with the first lens frame and the second lens frame so as to guide the first lens frame and the second lens frame in a direction of the optical axis. The first cam groove includes a first zoom section for moving the first lens frame between a telephoto position thereof and a wide-angle position thereof in accordance with a rotation of the cam barrel; and a first leading section for leading the first cam follower from a first cam follower insertion opening, which is open at an end of the cam barrel, to the first zoom section. The second cam groove includes a second zoom section for moving the second lens frame between a telephoto position thereof and a wide-angle position thereof in accordance with the rotation of the cam barrel; and a second leading section for leading the second cam follower from a second cam follower insertion opening, which is open at an end of the cam barrel, to the second zoom section. The first cam groove is formed so that the first cam follower insertion opening and the first zoom section are formed on opposite sides of the second zoom section in the direction of the optical axis, and the first leading section is formed on the first cam barrel to detour around an adjacent the second cam groove so as not to overlap the adjacent second cam groove.

Preferably, the first cam follower, the second cam follower, the first cam groove, and the second cam groove respectively include a plurality of first cam followers, a plurality of second cam followers, a plurality of first cam grooves, and a plurality of second cam grooves, respectively provided at an equi-angular distance.

In an embodiment, the first cam groove further includes a cam dead end positioned on the opposite side of the first zoom section with respect to the first leading section, the first cam follower not reaching the cam dead end during operation of the zoom lens. The cam dead end of the first cam groove and the second cam follower insertion opening of the second cam groove are formed at the same circumferential position in a circumferential direction of the cam barrel. Upon assembly of the first lens frame and the second lens frame to the cam barrel and the linear guide barrel, the first cam follower is inserted into the first leading section via the first cam follower insertion opening, the linear guide barrel and the cam barrel are rotated relative to each other until the first cam follower reaches the cam dead end of corresponding one of the first cam grooves, and subsequently, the second cam follower is inserted into the second leading section via the second cam follower insertion opening.

Preferably, the linear guide barrel is positioned inside the cam barrel, the linear barrel including a linear guide slot extending parallel to the optical axis, wherein the first lens frame includes a first guide projection and the second lens frame includes a second guide projection, the first guide projection and the second guide projection being engaged with a linear guide slot at different locations therein in the direction of the optical axis. The first guide projection is formed on the first lens frame at the same circumferential position as the first cam follower; and the second guide projection is formed on the second lens frame at the same circumferential position as the second cam follower. The first cam follower is fitted in the first cam groove via the linear guide slot; and the second cam follower is fitted in the second cam groove via the linear guide slot.

In an embodiment, the first lens frame includes a first resilient extending piece which extends in the direction of the optical axis to be elastically deformable radially inwards; the first guide projection is formed on the first resilient extending piece to extend radially outwards to be engaged with the linear guide slot; and the first cam follower is fixed to the first guide projection to extend radially outwards to be engaged with the first cam groove via the linear guide slot. The second lens frame includes a second resilient extending piece which extends in the direction of the optical axis to be elastically deformable radially inwards; the second guide projection is formed on the second resilient extending piece to extend radially outwards to be engaged with the linear guide slot; and the second cam follower is fixed to the second guide projection to extend radially outwards to be engaged with the second cam groove via the linear guide slot.

Preferably, the linear guide slot includes a plurality of linear guide slots, the first guide projection and second guide projection respectively include a plurality of first guide projections and a plurality of second guide projections, respectively equal to the number of the plurality of linear guide slots, and each of the first guide projections and corresponding one of the second guide projections are engaged with a common linear guide slot of the linear guide slots.

In an embodiment, the first cam groove further includes a first accommodation section positioned between the first zoom section and the first leading section; and the second cam groove further includes a second accommodation section on the opposite side of the second zoom section with respect to the second leading section. The first accommodation section and the second accommodation section are positioned in the same range in a circumferential direction of the cam barrel.

Each above-described aspect of the zoom lens of the present invention can, for example, be incorporated in a digital camera.

The present disclosure relates to subject matter contained in Japanese Patent Application No. 2000-23512 (filed on Feb. 1, 2000) which is expressly incorporated herein by reference in its entirety.

BRIEF DESCRIPTION OF THE DRAWINGS

The present invention will be described below in detail with reference to the accompanying drawings in which:

FIG. 17 is a front view of the external barrel that is supported by the external barrel to be freely rotatable about the optical axis, in a state where the barrier drive ring is rotated to one rotational limit thereof to thereby fully close the two pairs of barrier blades;

FIG. 18 is a front view of the external barrel shown in FIG. 17, in a state where the barrier drive ring is rotated to the other rotational limit thereof to thereby fully open the two pairs of barrier blades.

DESCRIPTION OF THE PREFERRED EMBODIMENT

Figure 1:
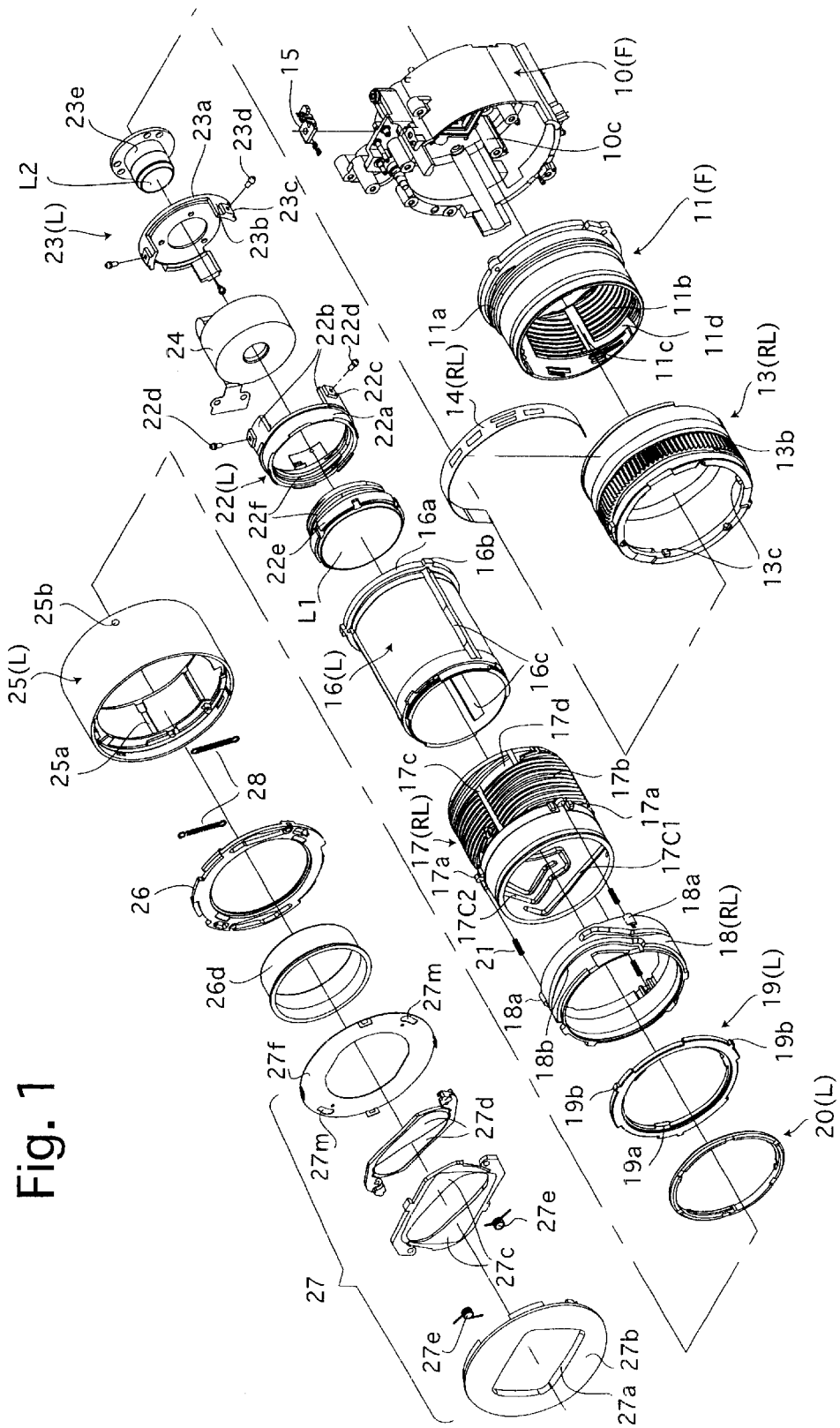
FIG. 1 is an exploded perspective view of an embodiment of a zoom lens according to the present invention, showing the overall structure thereof.

A preferred embodiment of a zoom lens (zoom lens barrel) according to the present invention that is incorporated in a digital camera will be hereinafter discussed. Firstly, the overall structure of the zoom lens will be discussed with reference mainly to FIGS. 1 and 2. In the drawings and the following descriptions, symbols "(F)", "(L)" and "(RL)" which are each appended as a suffix to the reference numeral of some elements of the zoom lens barrel indicate that the element is stationary, the element is movable linearly along an optical axis O of the zoom lens without rotating about the optical axis O, and the element is movable along the optical axis O while rotating about the optical axis O, respectively.

Figure 2:
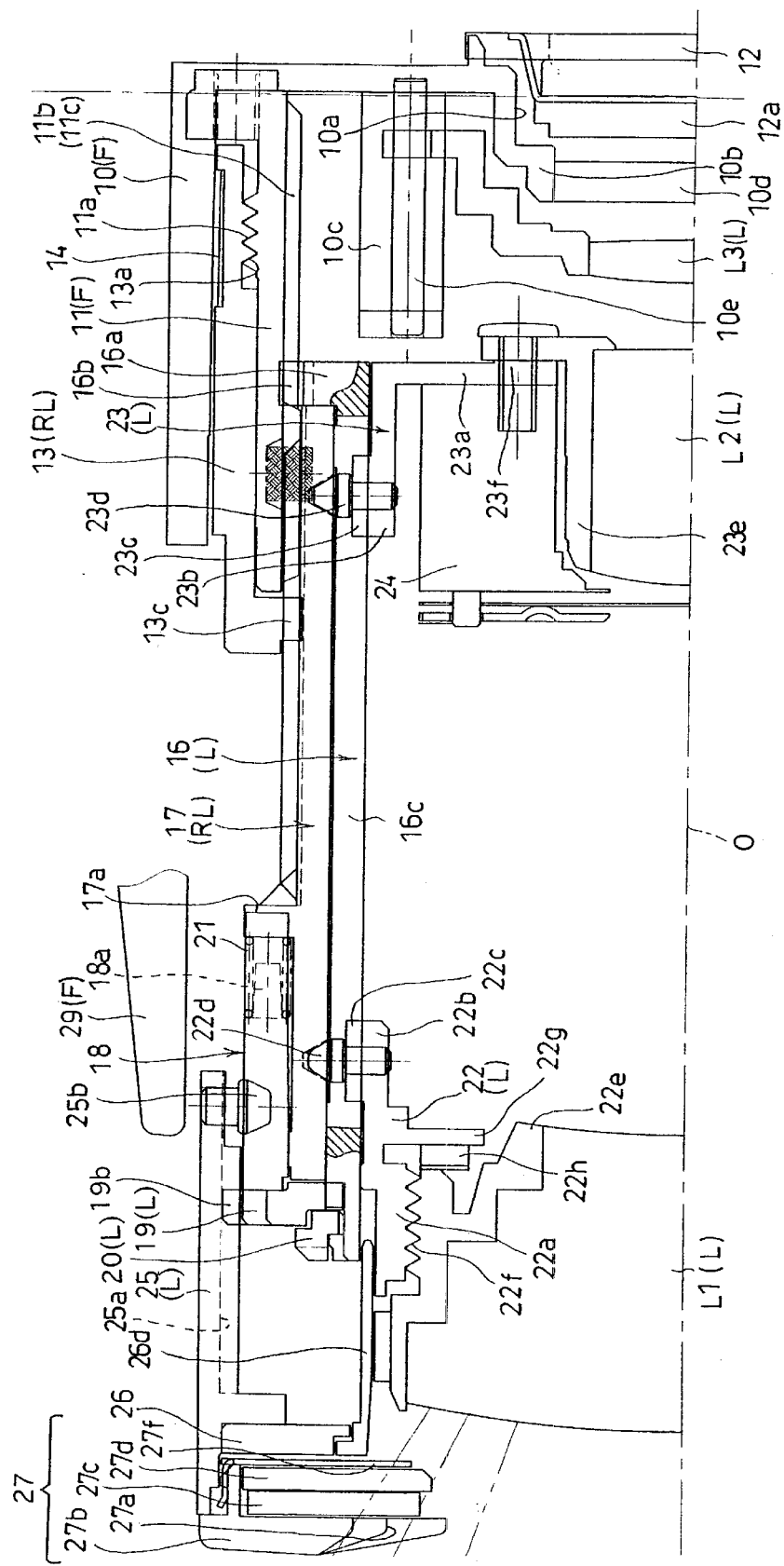
FIG. 2 is an axial cross sectional view of the zoom lens shown in FIG. 1, showing the zoom lens above the optical axis thereof.

The photographic optical system of the zoom lens includes three lens groups; namely, a first lens group (front lens group) L1 (L), a second lens group (middle lens group) L2 (L) and a third lens group (rear lens group) L3 (L), in this order from the object side (the left side as viewed in FIG. 2). The zoom lens performs zooming by moving the first and second lens groups L1 and L2 along the optical axis O relative to the sensitive surface of a stationary CCD 12a (see FIG. 2) and at the same time changing the space between the first and second lens groups L1 and L2 in a predetermined manner. The zoom lens performs a focusing operation by moving the third lens group L3 along the optical axis O to bring an object into focus. The third lens group L3 functions as a focusing lens group which is driven along the optical axis O independently of the axial position of each of the first and second lens groups L1 and L2. Thus, the zoom lens is an internal-focusing type zoom lens having a lens construction which allows the focus to be altered by moving the rearmost lens group provided as a focusing lens group internally within the lens barrel.

The zoom lens is provided with a housing 10(F) which is fixed to a camera body of a digital camera (not shown). The housing 10 can be integral with the camera body to be provided as an element thereof. The zoom lens is provided in the housing 10 with a stationary barrel 11(F) that is fixed to the housing 10. The stationary barrel 11 is provided on an outer peripheral surface thereof with a fine male thread 11a. The stationary barrel 11 is provided on an inner peripheral surface thereof with a female helicoid (female helicoidal thread) 11b and three linear guide grooves 11c (only one is shown in FIG. 1) extending parallel to the optical axis O, i.e., extending in the optical axis direction. The three linear guide grooves 11c are formed to cut across the female helicoid 11b. The three linear guide grooves 11c are formed at 120° intervals (i.e., at an equi-angular distance) about the axis of the stationary barrel 11.

As shown in FIG. 2, the housing 10 is provided with a CCD insertion opening 10a, a filter fixing portion 10b and a focusing lens group guide portion 10c. The CCD 12a which is fixed to a substrate 12 is positioned in the CCD insertion opening 10a. A filter 10d such as a low-pass filter is fixed to the filter fixing portion 10b. The third lens group L3 is guided by the focusing lens group guide portion 10c to be movable in the optical axis direction. The axial position of the third lens group L3 on the optical axis O is determined by the direction of rotation of a feed screw 10e and the angle of rotation (amount of rotation) thereof. The feed screw 10e extends parallel to the optical axis O from the camera body in the focusing lens group guide portion 10c. The feed screw 10e is driven by a pulse motor (not shown) provided in the camera body. The angle of rotation of the feed screw 10e is controlled via an encoder (not shown) of the pulse motor.

The zoom lens is provided on the stationary barrel 11 with a rotational barrel 13 (RL). The rotational barrel 13 is provided on an inner peripheral surface thereof with a fine female thread 13a which meshes with the fine male thread 11a of the stationary barrel 11. The rotational barrel 13 is provided on an outer peripheral surface thereof with a circumferential gear 13b (see FIG. 1). The rotational barrel 13 is driven to rotate about the optical axis O by a drive pinion (not shown) which meshes with the circumferential gear 13b. When the rotational barrel 13 is driven to rotate about the optical axis O, the rotational barrel 13 moves in the optical axis direction while rotating about the optical axis O in accordance with the engagement of the fine female thread 13a with the fine male thread 11a. The rotational barrel 13 is provided at the front end of an inner peripheral surface thereof with three inward projections 13c at 120° intervals about the axis of the rotational barrel 13. As shown in FIG. 1, a flexible coding plate 14 (RL) is fixed on an outer peripheral surface of the rotational barrel 13 along a circumference thereof, while a brush 15(F) that is in contact with the coding plate 14 is fixed to the housing 10. The brush 15 remains in sliding contact with the coding plate 14 regardless of a movement of the coding plate 14 relative to the brush 15 when the coding plate 14 moves in the optical axis direction in accordance with the engagement of the fine female thread 13a with the fine male thread 11a, so as to sense the rotational position of the rotational barrel 13 as digital and/or analogue information. The fine female thread 13a, which is provided on the rotational barrel 13, is provided as a device for supporting the rotational barrel 13 on the stationary barrel 11 so that the rotational barrel 13 can rotate freely about the optical axis O on the stationary barrel 11. However, alternatively, the rotational barrel 13 can be supported on the stationary barrel 11 so as to be able to rotate freely about the optical axis O without moving in the optical axis direction relative to the stationary barrel 11.

The zoom lens is further provided with a linear guide barrel 16 (L), a first cam barrel 17 (RL) and a second cam barrel 18 (RL). The first cam barrel 17 is fitted on the linear guide barrel 16 to be rotatable about the optical axis O relative to the linear guide barrel 16 and to be immovable in the optical axis direction relative to the linear guide barrel 16. The second cam barrel 18 is fitted on the front end of the first cam barrel 17 to be rotatable together with the first cam barrel 17 about the optical axis O and also to be movable in the optical axis direction relative to the first cam barrel 17. The linear guide barrel 16, the first cam barrel 17 and the second cam barrel 18 are assembled in advance as a unit, and the rear of this barrel unit is positioned in the stationary barrel 11. The linear guide barrel 16 is provided at the rear end thereof with an outer flange 16a. A linear guide ring (flange ring) 19(L) is fixed to the front end of the linear guide barrel 16 via a retainer ring 20(L). The first cam barrel 17 is held between the outer flange 16a and the linear guide ring 19, and is rotatable about the optical axis O relative to the linear guide barrel 16 and also movable together with the linear guide barrel 16 in the optical axis direction.

The second cam ring 18, which is fitted on the front end of the first cam barrel 17, is provided at the rear end thereof with three linear guide portions 18a (only two are shown in FIG. 1) at 120° intervals about the axis of the second cam ring 18. Each of the three linear guide portions 18a is provided with a spring holding groove 18a1, and a pair of guide grooves 18a2 positioned on the opposite sides of the spring holding groove 18a1 in a circumferential direction of the second cam ring 18 (see FIGS. 8 and 9). Each of the three linear guide portions 18a is further provided, in each spring holding groove 18a1 at the front end (the left end as viewed in FIG. 8 or 9) of each spring holding groove 18a1, with an engaging projection 18a3. All of the spring holding grooves 18a1 and the pairs of guide grooves 18a2 extend parallel to the optical axis O. The first cam barrel 17 is provided on an outer peripheral surface thereof with three stopper portions 17a (only two are shown in FIG. 1) at 120° intervals about the axis of the first cam barrel 17. Each of the three stopper portions 17a is provided with a stopper projection 17a1, and a pair of guide projections 17a2 positioned on the opposite sides of the stopper projection 17a1 in a circumferential direction of the first cam barrel 17 (see FIG. 4). Each pair of guide projections 17a2 of the first cam barrel 17 are respectively fitted in the corresponding pair of guide grooves 18a2 of the second cam ring 18 to be slidable in the optical axis direction relative to the second cam ring 18, with a compression spring 21 being held between each engaging projection 18a3 and the corresponding stopper projection 17a1. Due to this structure, the second cam barrel 18 can slide on the first cam barrel 17 in the optical axis direction without rotating about the optical axis O relative to the first cam barrel 17. The compression springs 21 constantly bias the second cam barrel 18 toward the front of the zoom lens, so that the front end of the second cam barrel 18 is usually in press-contact with the linear guide ring 19. The second cam barrel 18 can move rearward, toward the rear of the zoom lens, against the spring force of the compression springs 21 by an amount of movement corresponding to a predetermined clearance in the optical axis direction between the guide grooves 18a2 and the guide projections 17a2. The second cam barrel 18 can also be slightly inclined with respect to the first cam barrel 17 (i.e., with respect to the optical axis O) by an amount of inclination corresponding to a predetermined clearance in a radial direction between the inner peripheral surface of the second cam barrel 18 and the corresponding outer peripheral surface of the first cam barrel 17.

The first cam barrel 17 is provided on an outer peripheral surface thereof with a male helicoid (male helicoidal thread) 17b that is engaged with the female helicoid 11b of the stationary barrel 11, and three rotation transmission grooves 17c that extend parallel to the optical axis O. The three rotation transmission grooves 17c are formed so as to cut across the male helicoid 17b. The three rotation transmission grooves 17c are formed at 120° intervals about the axis of the first cam barrel 17. The three inward projections 13c of the rotational barrel 13 are respectively engaged with the three rotation transmission grooves 17c to be relatively slidable to each other. The linear guide barrel 16 is provided on the outer flange 16a thereof with three linear guide projections 16b at 120° intervals about the axis of the linear guide barrel 16. Each linear guide projection 16b extends radially outwards to be engaged with the corresponding linear guide groove 11c of the stationary barrel 11. The linear guide barrel 16 is further provided with three linear guide slots 16c at 120° intervals about the axis of the linear guide barrel 16 so that the circumferential positions of the three linear guide slots 16c coincide with those of the three linear guide projections 16b. Each of the three linear guide slots 16c penetrates the linear guide barrel 16 radially and extends parallel to the optical axis O.

Figure 4:
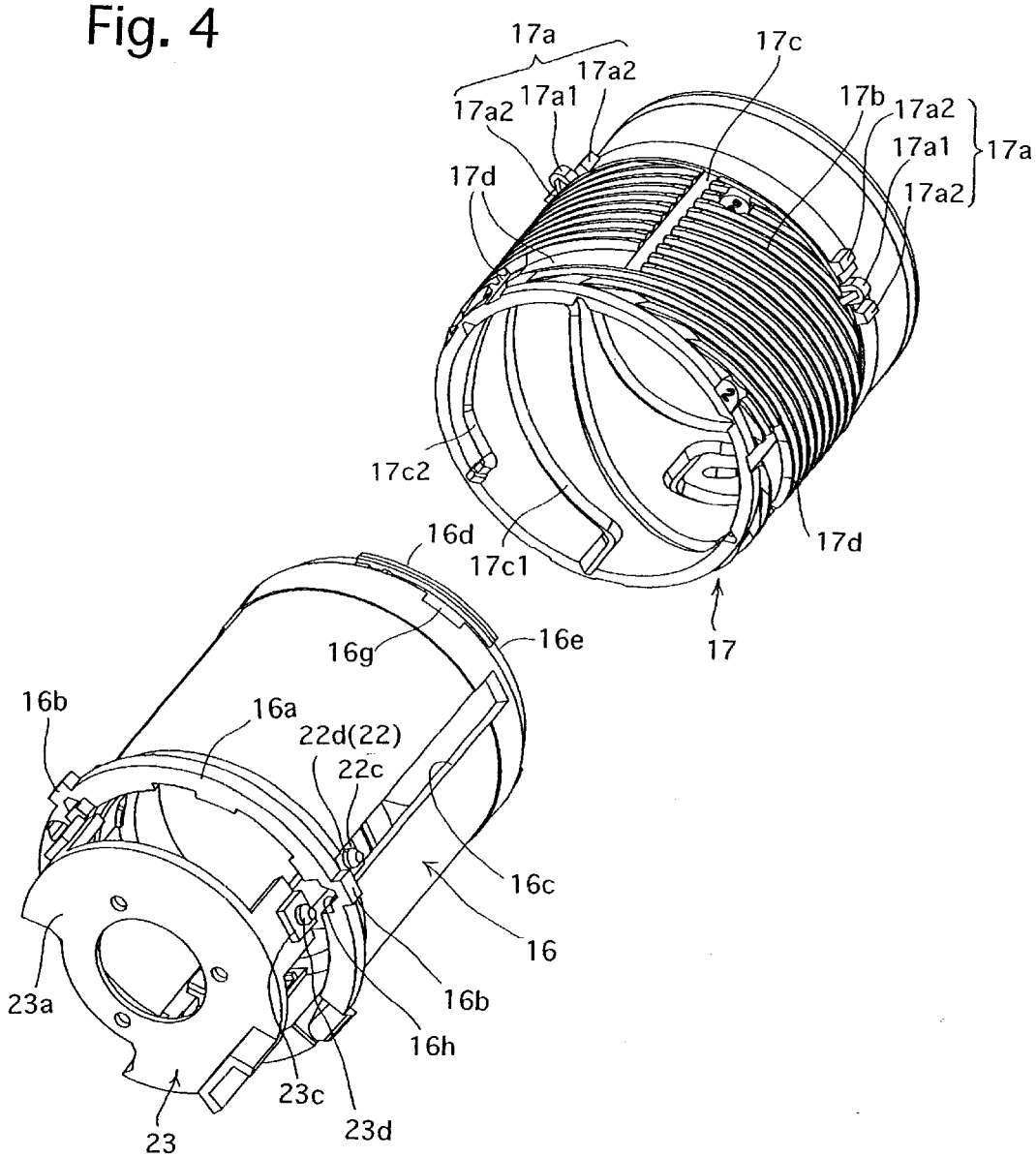
FIG. 4 is an exploded perspective view of the first cam barrel shown in FIG. 3, a linear guide barrel, a first lens frame and a second lens frame.
Figure 5:
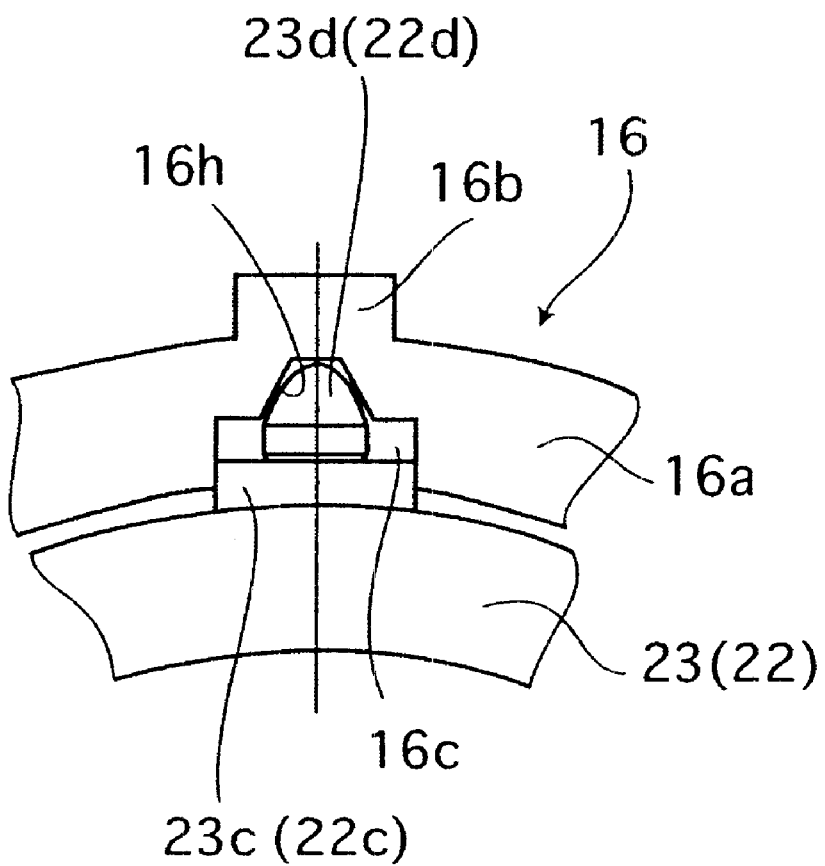
FIG. 5 is a fragmentary rear view of the linear guide barrel and the first lens frame, showing the periphery of an insertion groove of the linear guide barrel.
Figure 6:
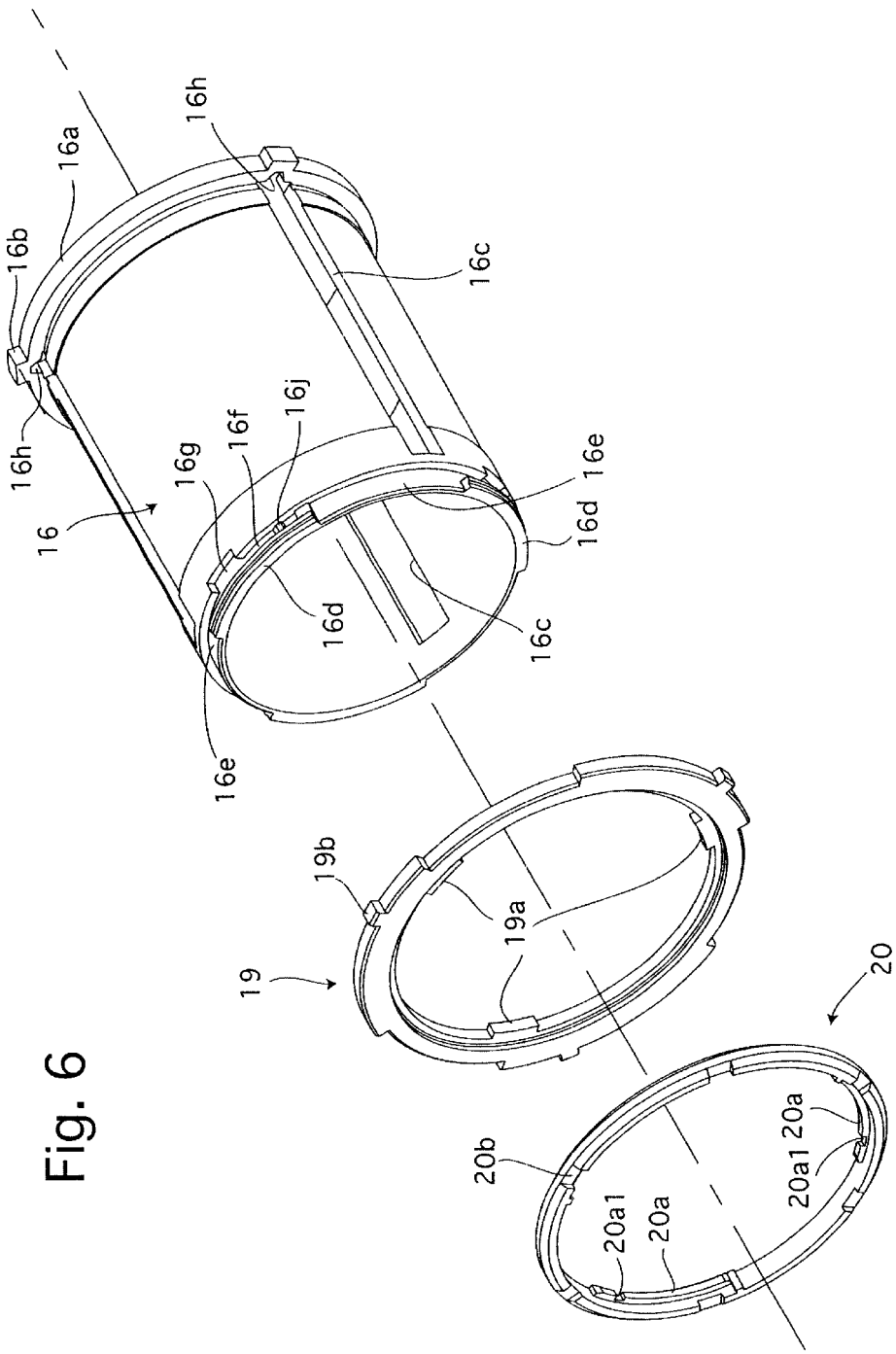
FIG. 6 is an exploded perspective view of the linear guide barrel, a linear guide ring and a retainer ring.

As can be seen in FIGS. 4, 5 and 6, each of the three linear guide slots 16c opens at the rear end of the linear guide barrel 16, and the rear end of each linear guide slot 16c is covered by the corresponding part of the outer flange 16a and the corresponding linear guide projection 16b at the radially outer side of the linear guide barrel 16. The outer flange 16a is provided with three insertion grooves 16h which respectively extend along a portion of each three linear guide slots 16c from the front end of the outer flange 16a to each respective rear end of the three linear guide slots 16c (i.e., the rear end of the outer flange 16a), so that a follower pin (cam follower) 22d and a follower pin (cam follower) 23d can be inserted into each linear guide slot 16c from the corresponding insertion groove 16h.

When the barrel unit which includes the linear guide barrel 16, the first cam barrel 17 and the second cam barrel 18 is coupled to the stationary barrel 11 and the rotational barrel 13, each of the three linear guide projections 16b of the linear guide barrel 16 is inserted into the corresponding linear guide groove 11c of the stationary barrel 11 via a corresponding introducing groove lid formed on an inner peripheral surface of the stationary barrel 11, and each of the three inward projections 13c of the rotational barrel 13 is inserted into the corresponding rotation transmission groove 17c of the first cam barrel 17 via a corresponding introducing groove 17d formed on an outer peripheral surface of the first cam barrel 17. After each linear guide projection 16b and each inward projection 13c are inserted into the corresponding linear guide groove 11c and the corresponding rotation transmission groove 17c, respectively, the female helicoid 11b of the stationary barrel 11 and the male helicoid 17b of the first cam barrel 17 mesh with each other.

FIG. 2 shows a state where the barrel unit, which includes the linear guide barrel 16, the first cam barrel 17 and the second cam barrel 18, has been coupled to the stationary barrel 11 and the rotational barrel 13. In this state, rotating the rotational barrel 13 about the optical axis O via the gear 13b causes the rotational barrel 13 to move in the optical axis direction while rotating about the optical axis O due to the engagement of the fine female thread 13a with the fine male thread 11a. At the same time, the rotation of the rotational barrel 13 is transmitted to the first cam barrel 17 and the second cam barrel 18, which is fitted on the first cam barrel 17, due to the engagement of the inward projections 13c with the rotation transmission grooves 17c, so that the first cam barrel 17 and the second cam barrel 18 rotate about the optical axis O. At this time, the first cam barrel 17 and the second cam barrel 18 also move in the optical axis direction O due to the engagement of the male helicoid 17b with the female helicoid 11b. Furthermore, the linear guide barrel 16 moves in the optical axis direction without rotating about the optical axis O due to the engagement of the linear guide projections 16b with the linear guide grooves 11c, and at the same time the first and second cam barrels 17 and 18, which rotate about the optical axis O relative to the linear guide barrel 16, move together with the linear guide barrel 16 in the optical axis direction.

Figure 3:
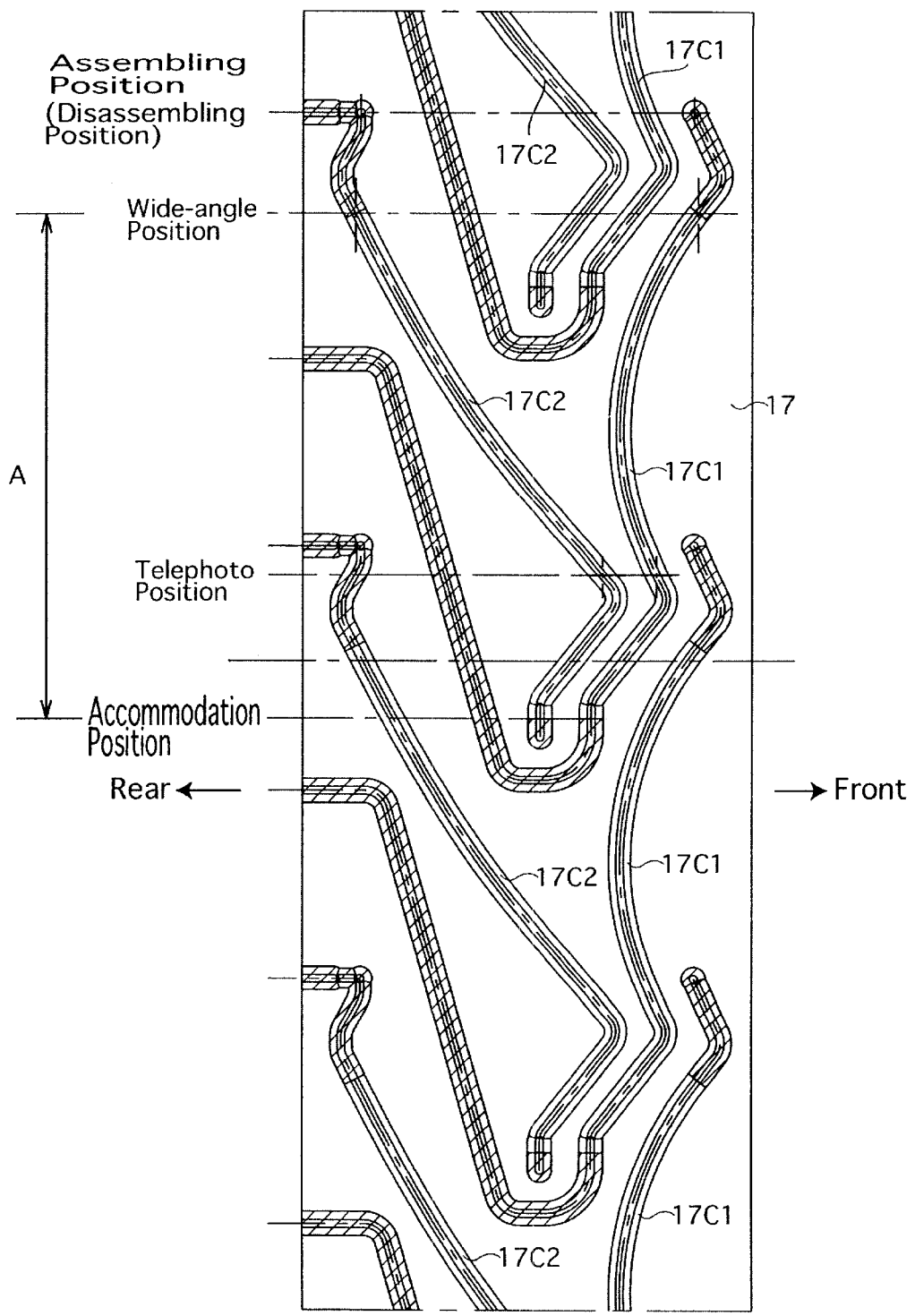
FIG. 3 is a developed view of the inner peripheral surface of a first cam barrel, showing the contours of first and second cam grooves formed on the inner peripheral surface of the first cam barrel.

The first cam barrel 17 is provided on an inner peripheral surface thereof with three first cam grooves 17C1 for driving the first lens group L1, and three second cam grooves 17C2 for driving the second lens group L2. FIG. 3 is a developed view of the inner peripheral surface of the first cam barrel 17, showing the contours (profiles) of the first and second cam grooves 17C1 and 17C2. The three first cam grooves 17C1 are formed on the inner peripheral surface of the first cam barrel 17 at 120° intervals about the axis of the first cam barrel 17. Likewise, the three second cam grooves 17C2 are formed on the inner peripheral surface of the first cam barrel 17 at 120° intervals about the axis of the first cam barrel 17. Each of the first and second cam grooves 17C1 and 17C2 has three predetermined positions: an accommodation position, a telephoto position and a wide-angle, in this order along the direction of rotation of the first cam barrel 17 (the vertical direction as viewed in FIG. 3). The telephoto position shown in FIG. 3 of each cam groove 17C1 and 17C2 determines the telephoto extremity of the corresponding lens groups L1 and L2, respectively; the wide-angle position of each cam groove 17C1 and 17C2 determines the wide-angle extremity of the corresponding lens groups L1 and L2, respectively; and the accommodation position of each cam groove 17C1 and 17C2 determines the position of the corresponding lens groups L1 and L2, respectively, when the power of the digital camera is turned OFF. The angle of rotation from the accommodation position to the wide-angle extremity position is shown by "A" in FIG. 3.

The zoom lens is provided with a first lens frame 22(L) and a second lens frame 23(L) which support the first lens group L1 and the second lens group L2, respectively. The first lens frame 22 is guided by the first cam grooves 17C1 and the linear guide slots 16c to be movable in the optical axis direction without rotating about the optical axis O. Likewise, the second lens frame 23 is guided by the second cam grooves 17C2 and the linear guide slots 16c to be movable in the optical axis direction without rotating about the optical axis O. The first lens frame 22 is provided with three resilient extending pieces 22b which extend rearward from a cylindrical portion 22a of the first lens frame 22. The three resilient extending pieces 22b are formed on the first lens frame 22 at 120° intervals about the axis of the first lens frame 22. Each resilient extending piece 22b is provided on a radially outer surface thereof with a square projection (first guide projection) 22c which extends radially outwards to be fitted in the corresponding linear guide slot 16c in a slidable manner in the optical axis direction. Each resilient extending piece 22b is further provided on top of each square projection 22c with the follower pin 22d, which is fixed to the resilient extending piece 22b to extend radially outwards. Each square projection 22c is formed so that the opposite faces thereof, which are respectively in sliding contact with the side faces of the corresponding linear guide slot 16c, extend parallel to each other. The zoom lens is provided with a first lens holder 22e which encloses the first lens group L1 to hold the same. The first lens holder 22e is fixed to the cylindrical portion 22a of the first lens frame 22 via male and female threads 22f which are formed on an outer peripheral surface of the first lens holder 22e and an inner peripheral surface of the cylindrical portion 22a, respectively. The position of the first lens group L1 relative to the first lens frame 22 in the optical axis direction can be adjusted by varying the amount of engagement between the male and female threads 22f. A wave washer 22h is held between the holder 22e and an inner flange 22g of the first lens frame 22 to remove the play between the first lens holder 22e (or the first lens group L1) and the first lens frame 22 (see FIG. 2).

The second lens frame 23 is provided with three resilient extending pieces 23b which extend forward from an annular plate portion 23a of the second lens frame 23. The three resilient extending pieces 23b are formed on the second lens frame 23 at 120° intervals about the axis of the second lens frame 23. Each resilient extending piece 23b is provided on a radially outer surface thereof with a square projection (second guide projection) 23c which extends radially outwards to be fitted in the corresponding linear guide slot 16c in a slidable manner in the optical axis direction. Each resilient extending piece 23b is further provided on top of each square projection 23c with the aforementioned follower pin 23d, which is fixed to the resilient extending piece 23b to extend radially outwards. The square projections 23c and the follower pins 23d of the second lens frame 23 are identical to the square projections 22c and the follower pins 22d of the first lens frame 22 except that the resilient extending pieces 23b of the second lens frame 23 extend in the direction opposite to the resilient extending pieces 22b of the first lens frame 22 in the optical axis direction. The zoom lens is provided with a second lens holder 23e which encloses the second lens group L2 to hold the same. The second lens holder 23e is fixed to the annular plate portion 23a of the second lens frame 23 via set screws 23f. A shutter block 24 is provided around the second lens group L2. The shutter block 24 is fixed to the annular plate portion 23a of the second lens frame 23 via the set screws 23f that are screwed into the rear of the shutter block 24. The shutter block 24 functions to interrupt light bundles which are incident on the CCD 12a at a shutter release operation.

Each of the first and second lens frames 22 and 23 is guided linearly in the optical axis direction without rotating about the optical axis O by the engagement of each of the three square projections 22c and corresponding each of the three square projections 23c with each common corresponding linear guide slot of the three linear guide slots 16c. Each follower pin 22d penetrates the corresponding linear guide slot 16c of the linear guide barrel 16 to be engaged with the corresponding first cam groove 17C1 of the first cam barrel 17, which is fitted on the linear guide barrel 16 to be rotatable about the optical axis relative to linear guide barrel 16. Likewise, each follower pin 23d penetrates the corresponding linear guide slot 16c of the linear guide barrel 16 to be engaged with the corresponding second cam groove 17C2 of the first cam barrel 17. When the first and second lens frames 22 and 23 are placed in the linear guide barrel 16 and the first cam barrel 17, firstly each of the three square projections 22c and corresponding one of the three square projections 23c are inserted into a corresponding linear guide slot of the three linear guide slots 16c from the rear end face of the linear guide barrel 16. At the same time, each of the three follower pins 22d and corresponding one of the three follower pins 23d are inserted into corresponding one of the three insertion grooves 16h to be fitted in the corresponding first and second cam grooves 17C1 and 17C2, respectively. It should be noted that the hatched areas of the first and second cam grooves 17C1 and 17C2 in FIG. 3 are used solely for the purpose of inserting each follower pin 22d or 23d into the corresponding cam groove 17C1 or 17C2 during assembly, and thus are not used when the zoom lens is in operation.

According to the above described guide structure, rotating the rotational barrel 13 about the optical axis O causes the barrel unit which includes the linear guide barrel 16, the first cam barrel 17 and the second cam barrel 18 to move in the optical axis direction. During this movement of the barrel unit, the first and second cam barrels 17 and 18 rotate together about the optical axis O, but the linear guide barrel 16 does not rotate about the optical axis O. As a result, the first lens frame 22 (the first lens group L1) and the second lens frame 23 (the second lens group L2) linearly move in the optical axis direction while changing the space therebetween in accordance with the contours of the first and second cam grooves 17C1 and 17C2 to thereby carry out a zooming operation.

Figure 7:
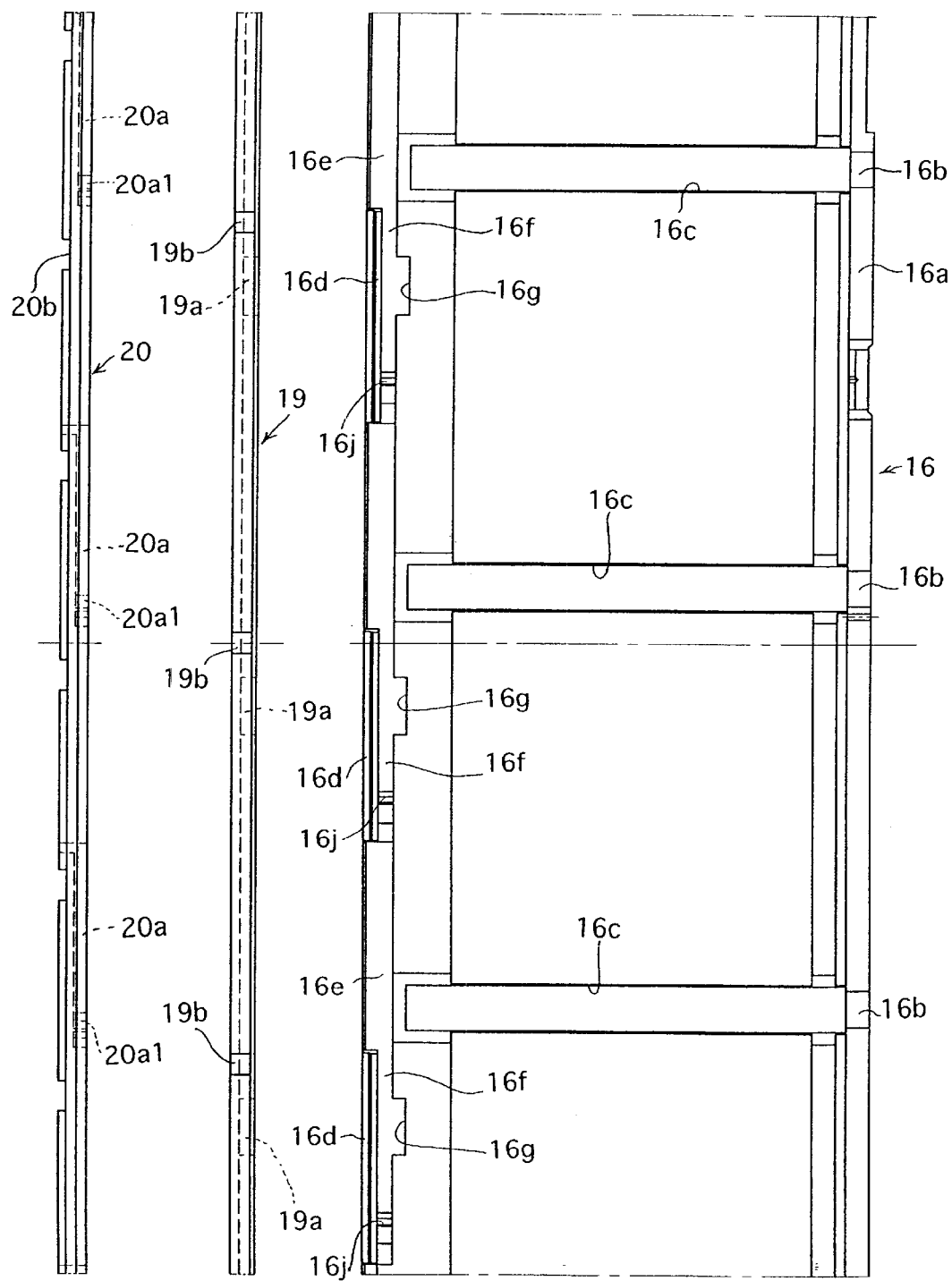
FIG. 7 is a developed view of the linear guide barrel, the linear guide ring and the retainer ring.

The coupling structure of the linear guide ring 19 and the retainer ring 20 to the front end of the linear guide barrel 16 will be hereinafter discussed with reference to FIGS. 6 and 7. The linear guide barrel 16 is provided, at the front end thereof at 120° intervals about the axis of the linear guide barrel 16, with three engaging lugs 16d each of which extends radially outwards. A receiving area 16e is formed between any two adjacent engaging lugs 16d of the linear guide barrel 16 in order to receive one of three radially inward projections 19a of the linear guide ring 19. The linear guide barrel 16 is provided immediately behind the three engaging lugs 16d with three grooves 16f, respectively. The radius of the linear guide barrel 16 from the axis of the linear guide barrel 16 to the bottom surface of each groove 16f is identical to the radius from the axis of the linear guide barrel 16 to the surface of each receiving area 16e. The linear guide barrel 16 is provided behind the three engaging lugs 16d with three recesses 16g, respectively, each of which is connected with the corresponding groove 16f. Each recess 16g is recessed rearward (toward the right as viewed in FIG. 7) in the direction parallel to the optical axis O, i.e., in the optical axis direction.

On the other hand, the linear guide ring 19 is provided with the aforementioned three inward projections 19a at 120° intervals about the axis of the linear guide ring 19. The three inward projections 19a can be inserted into the three receiving areas 16e, respectively. If the linear guide ring 19 is rotated about the axis thereof clockwise as viewed in FIG. 6 relative to the linear guide barrel 16 with the three inward projections 19a being properly inserted into the three receiving areas 16e, respectively, each inward projection 19a slides into the corresponding groove 16f. The linear guide ring 19 is provided with three radially outward projections 19b at 120° intervals about the axis of the linear guide ring 19. The circumferential positions of the three outward projections 19b are precisely determined with reference to the circumferential positions of the three inward projections 19a.

The retainer ring 20 is provided with radially inward blades 20a at 120° intervals about the axis of the retainer ring 20. The three inward blades 20a can be inserted into the three receiving areas 16e of the linear guide barrel 16, respectively. If the retainer ring 20 is rotated about the axis thereof clockwise as viewed in FIG. 6 relative to the linear guide barrel 16 with the three inward blades 20a being properly inserted into the three receiving areas 16e, respectively, each inward blade 20a slides into the corresponding groove 16f. The retainer ring 20 is provided on the front end face thereof with a plurality of grooves 20b which are recessed rearward, toward the linear guide barrel 16, so that a pin face wrench (not shown) can be engaged with the recessed portions 20b to rotate the retainer ring 20 relative to the linear guide barrel 16.

When the linear guide ring 19 is fixed to the front end of the linear guide barrel 16, firstly the three inward projections 19a are respectively inserted into the three receiving areas 16e, and then the linear guide ring 19 is rotated about the axis thereof clockwise as viewed in FIG. 6 relative to the linear guide barrel 16 so that each inward projection 19a slides into the corresponding groove 16f. Subsequently, each inward projection 19a is made to be fitted in the corresponding recess 16g. This engagement of each inward projection 19a with the corresponding recess 16g determines the fixed circumferential position of the linear guide ring 19 relative to the linear guide barrel 16. Subsequently, the inward blades 20a of the retainer ring 20 are respectively inserted into the three receiving areas 16e, and then the retainer ring 20 is rotated about the axis thereof clockwise as viewed in FIG. 6 relative to the linear guide barrel 16 so that each inward blade 20a slides into the corresponding groove 16f and presses the corresponding inward projection 19a into the corresponding recess 16g. This prevents the linear guide ring 19 from moving in the optical axis direction relative to the linear guide barrel 16. In this state, since each of the three inward blades 20a of the retainer ring 20 is held in one of the three grooves 16f between the corresponding engaging lug 16d and the corresponding inward projection 19a, the inward blades 20a and the engaging lugs 16d function to prevent the linear guide ring 19 from coming off the front end of the linear guide barrel 16. Between the linear guide barrel 16 and the retainer ring 20 is provided a click-stop device which prevents the retainer ring 20 from rotating counterclockwise as viewed in FIG. 6 so that the retainer ring 20 cannot come off the front end of the linear guide barrel 16 after the retainer ring 20 is properly engaged with the linear guide barrel 16. Three indentations 20a1 which are formed on the retainer ring 20 and corresponding three detent 16j which are formed on the linear guide barrel 16 to be respectively engaged with the three indentations 20a1 constitute the elements of the click-stop device (see FIGS. 6 and 7).

Accordingly, the outward projections 19b of the linear guide ring 19 that is fixed to the front end of the linear guide barrel 16 in the above described manner are located at predetermined specific positions (angular positions) relative to the linear guide projections 16b. The zoom lens is provided at the front thereof with an external barrel (a hood barrel) 25(L). The external barrel 25 is provided, on an inner peripheral surface thereof at 120° intervals about the axis of the external barrel 25, with three linear guide grooves 25a which extend parallel to the optical axis O. The three outward projections 19b of the linear guide ring 19 are respectively engaged with the three linear guide grooves 25a to guide the external barrel 25 to move in the optical axis direction without rotating about the optical axis O. The external barrel 25 is provided at the rear end thereof with three radially inward pins 25b which are respectively engaged with three guide grooves 18b formed on outer peripheral surface of the second cam barrel 18 at 120° intervals about the axis thereof.

Figure 8:
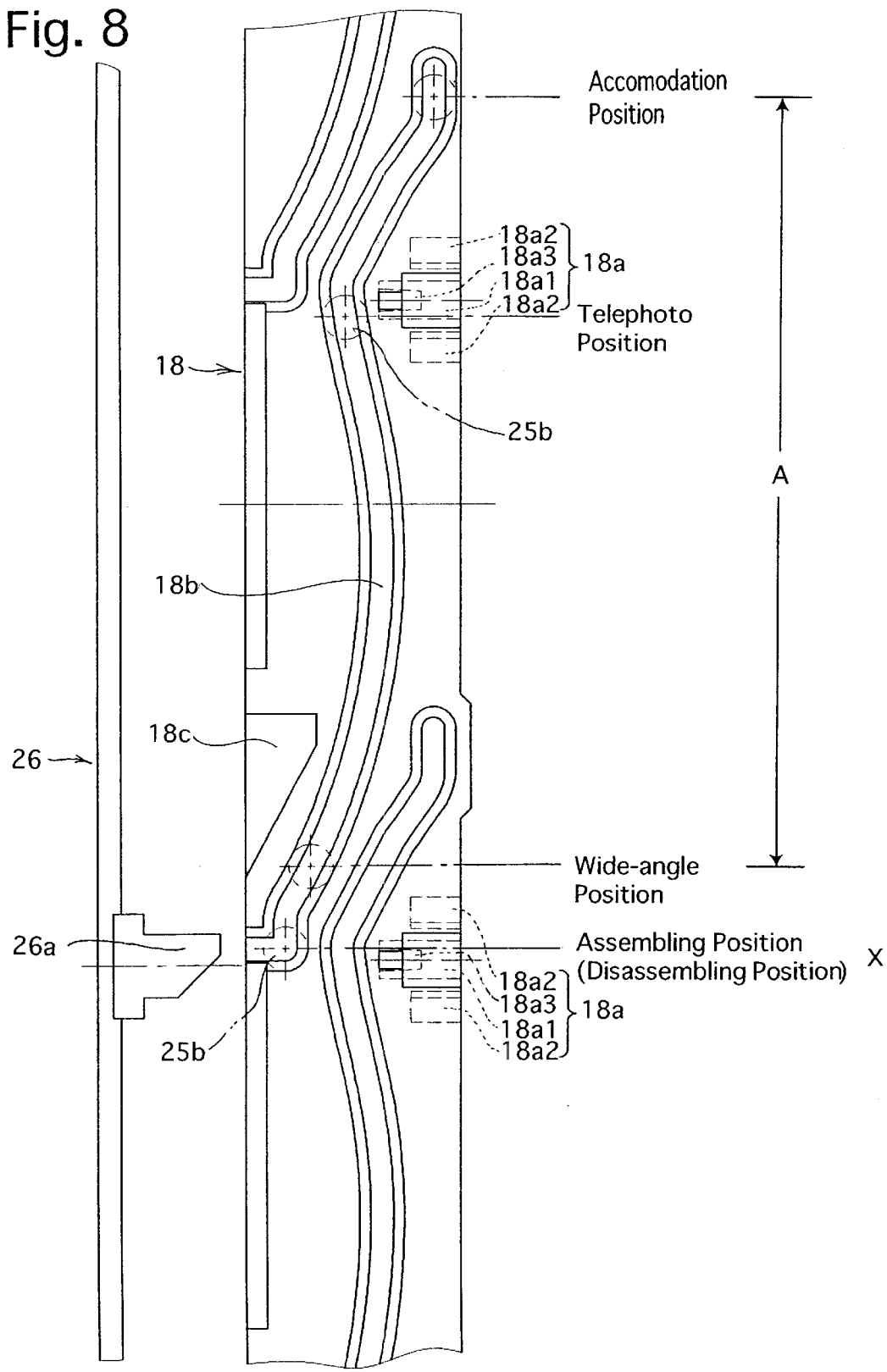
FIG. 8 is a developed view of a second cam barrel and a barrier drive ring, showing the positional relationship therebetween when the zoom lens is set at the telephoto extremity thereof (when the zoom lens is in a ready-to-photograph state)

As shown in FIG. 8, each of the three guide grooves 18b of the second cam barrel 18 defines an assembling position (or a disassembling position) X at which the three inward pins 25b of the external barrel 25 are respectively inserted into or taken out of the three guide grooves 18b of the second cam barrel 18. Each of the three guide grooves 18b further defines an accommodation position, a telephoto position and a wide-angle extremity, which determine the accommodation position, the telephoto extremity and the wide-angle extremity of the first cam barrel 17, respectively. The three guide grooves 18b are formed to move the external barrel 25 in the optical axis direction in accordance with the rotational position of the second cam barrel 18, which rotates together with the first cam barrel 17. More specifically, the three guide grooves 18b are formed to make the external barrel 25 function as a movable lens hood so that the external barrel 25 advances relative to the second cam barrel 18 (i.e., the f first lens group L1) when the zoom lens is set at the telephoto extremity thereof having a narrow angle of view while the external barrel 25 retreats relative to the second cam barrel 18 when the zoom lens is set at the wide-angle extremity thereof having a wide angle of view. The external barrel 25 is positioned in the wide-angle extremity thereof and the telephoto extremity thereof in FIG. 10 and FIG. 11, respectively.

If the external barrel 25 is pressed rearward (i.e., toward the camera body) by an external force when the camera is in use, the compression springs 21 function as shock absorbers which can absorb at least part of such an external force since the compression springs 21 are positioned between the first cam barrel 17, which guides the first and second lens groups L1 and L2 in the optical axis direction, and the second cam barrel 18, which guides the external barrel 25 in the optical axis direction. Such an external force is transmitted partly to the first cam barrel 17 after having been absorbed to some extent by the compression springs 21, which prevents large external forces from being applied to the first cam barrel 17. Consequently, the precision of the axial position of each of the first and second lens groups L1 and L2 is influenced negligibly by external forces applied to the external barrel 25. In FIG. 2, the reference numeral 29(F) designates a stationary external barrel which is integral with the camera body. The external barrel 25 advances and retreats with respect to the stationary external barrel 29.

Figure 13:
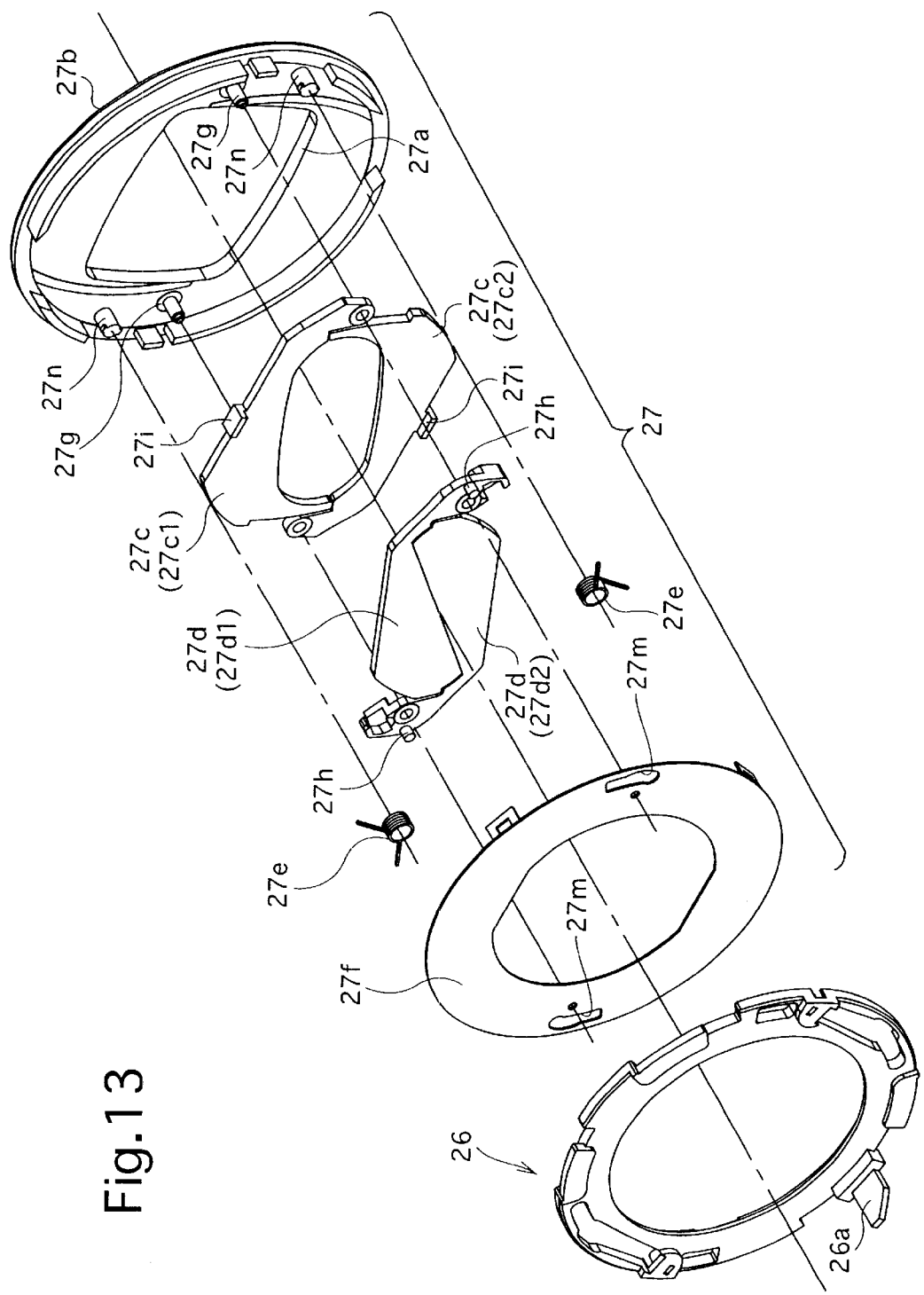
FIG. 13 is an exploded perspective view of the barrier block, viewed from behind the barrier block.
Figure 14:
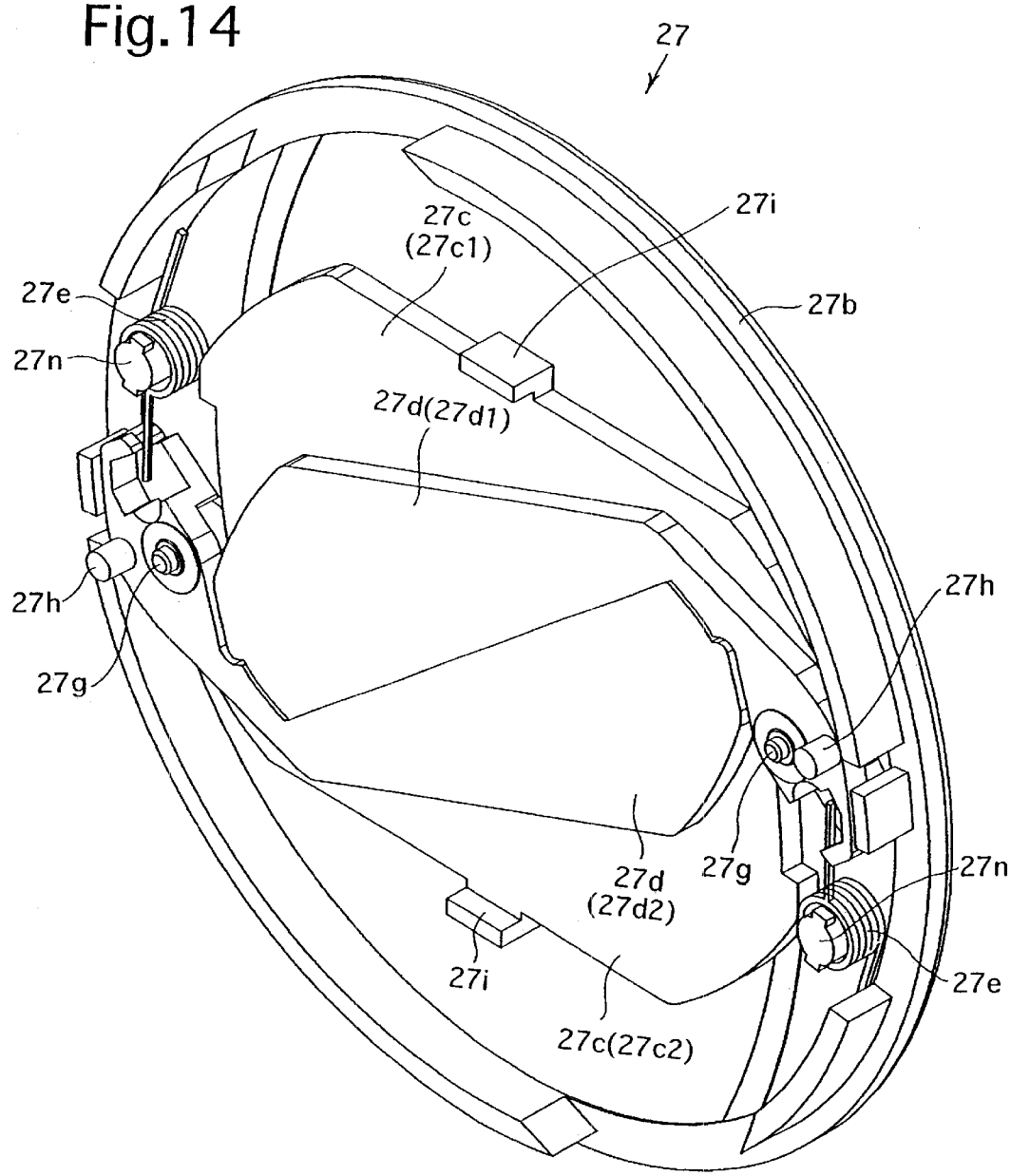
FIG. 14 is a perspective view of the barrier block with an annular pressure plate being removed from the barrier block, viewed from behind the barrier block.
Figure 15A:
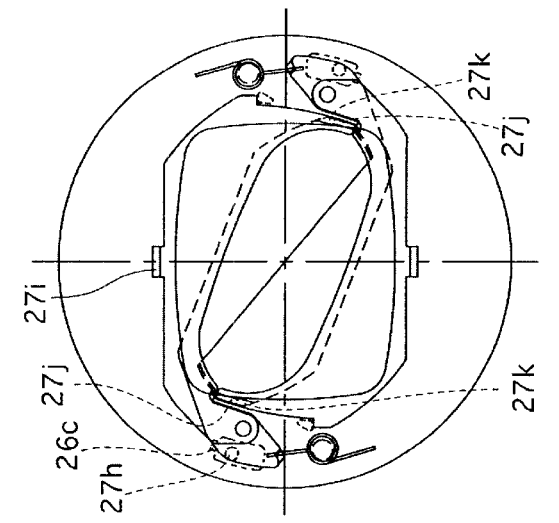
FIG. 15A is a schematic front view of the barrier block, showing two pairs of barrier blades in a fully open position.
Figure 15B:
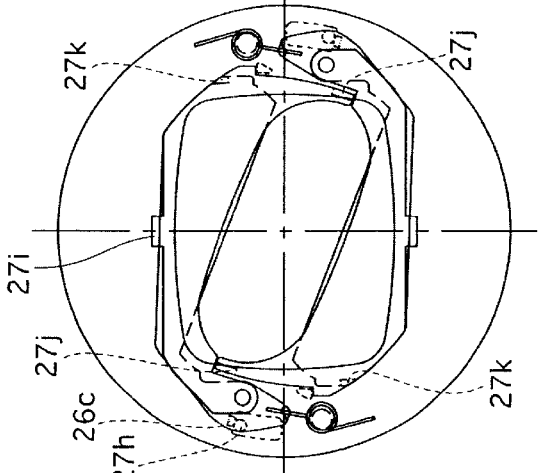
FIG. 15B is a schematic front view of the barrier block, showing the two pairs of barrier blades in a half-closed position.
Figure 15C:
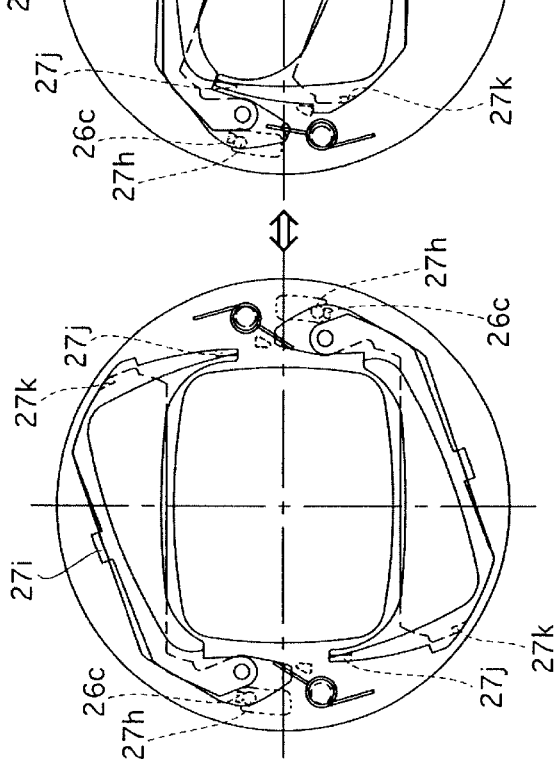
FIG. 15C is a schematic front view of the barrier block, showing the two pairs of barrier blades in a fully closed position.

The external barrel 25 is provided, at the front thereof in the radially inner side of the external barrel 25, with a barrier drive ring 26, so that the barrier drive ring 26 can rotate about the optical axis O. The barrier drive ring 26 functions to open and close two pairs of barrier blades 27c and 27d (i.e. the front pair of barrier blades 27c and the rear pair of barrier blades 27d) by rotating about the optical axis O. The two pairs of barrier blades 27c and 27d together function as a lens protection cover for protecting the front surface of the first lens group L1 from getting scratched, etc., when the digital camera is not in use. The barrier block 27 is provided with a panel 27b having a photographic aperture 27a, the aforementioned two pairs of barrier blades 27c and 27d supported by the panel 27b therebehind to open and close the photographic aperture 27a, and two torsion springs 27e which constantly bias the two pairs of barrier blades 27c and 27d in a direction to close the photographic aperture 27a. The barrier block 27 is further provided with an annular pressure plate 27f which holds the two pairs of barrier blades 27c and 27d and the torsion springs 27e between the panel 27b and the pressure plate 27f. The barrier block 27 having such elements is assembled in advance as a unit. The panel 27b is provided on a rear face thereof with two pivots 27g (see FIGS. 13 and 14) and two engaging pins 27n. The upper front barrier blade 27c1 of the front pair of barrier blades 27c and the upper rear barrier blade 27*d*1 of the rear pair of barrier blades 27*d* are pivoted at corresponding one of the two pivots 27*g* (the right pivot 27*g* as viewed in FIG. 13), while the lower front barrier blade 27*c*2 of the front pair of barrier blades 27*c* and the lower rear barrier blade 27*d*2 of the rear pair of barrier blades 27*d* are pivoted at the other pivot 27*g* (the left pivot 27*g* as viewed in FIG. 13). Each of the rear pair of barrier blades 27*d* is constantly biased to rotate in a direction to close the photographic aperture 27*a* of the panel 27*b* by the corresponding torsion spring 27*e* whose coil portion is fitted on the corresponding engaging pin 27*n*. Each of the rear pair of barrier blades 27*d* is provided in the vicinity of the pivoted portion thereof with a driven pin 27*h* that is driven to open the corresponding rear barrier blade 27*d* against the spring force of the corresponding torsion spring 27*e*. Each of the front pair of barrier blades 27*c* is provided on an outer edge thereof with an engaging projection 27*i* which extends rearward to be engaged with the outer edge of the corresponding rear barrier blade 27*d* so that the engaging projection 27*i* of each of the front pair of barrier blades 27*c* comes into engagement with the outer edge of the corresponding rear barrier blade 27*d* to rotate the corresponding front barrier blade 27*c* in the direction to open the photographic aperture 27*a* together with the corresponding rear barrier blade 27*d* when the corresponding rear barrier blade 27*d* is driven to rotate in the direction to open the photographic aperture 27*a*. The upper front barrier blade 27*c*1 is provided on a rear surface thereof with an engaging projection 27*j*, while the upper rear barrier blade 27*d*1 is provided on a front surface thereof with an engaging projection 27*k* (see FIGS. 15A, 15B and 15C). When the upper rear barrier blade 27*d*1 is driven to rotate in the direction to close the photographic aperture 27*a*, the engaging projection 27*k* of the upper rear barrier blade 27*d*1 is engaged with the engaging projection 27*j* of the upper front barrier blade 27*c*1 to drive the upper front barrier blade 27*c*1 to rotate in the direction to close the photographic aperture 27*a* together with the upper rear barrier blade 27*d*1. Likewise, the lower front barrier blade 27*c*2 is provided on a rear surface thereof with an engaging projection 27*j*, while the lower rear barrier blade 27*d*2 is provided on a front surface thereof with an engaging projection 27*k* (see FIGS. 15A, 15B and 15C). When the lower rear barrier blade 27*d*2 is driven to rotate in the direction to close the photographic aperture 27*a*, the engaging projection 27*k* of the lower rear barrier blade 27*d*2 is engaged with the engaging projection 27*j* of the lower front barrier blade 27*c*2 to drive the lower front barrier blade 27*c*2 to rotate in the direction to close the photographic aperture 27*a* together with the lower rear barrier blade 27*d*2.

The pressure plate 27*f* is provided with two slots 27*m* through which the two drive pins 27*h* of the rear pair of barrier blades 27*d* penetrate toward the barrier drive ring 26, respectively.

Figure 16:
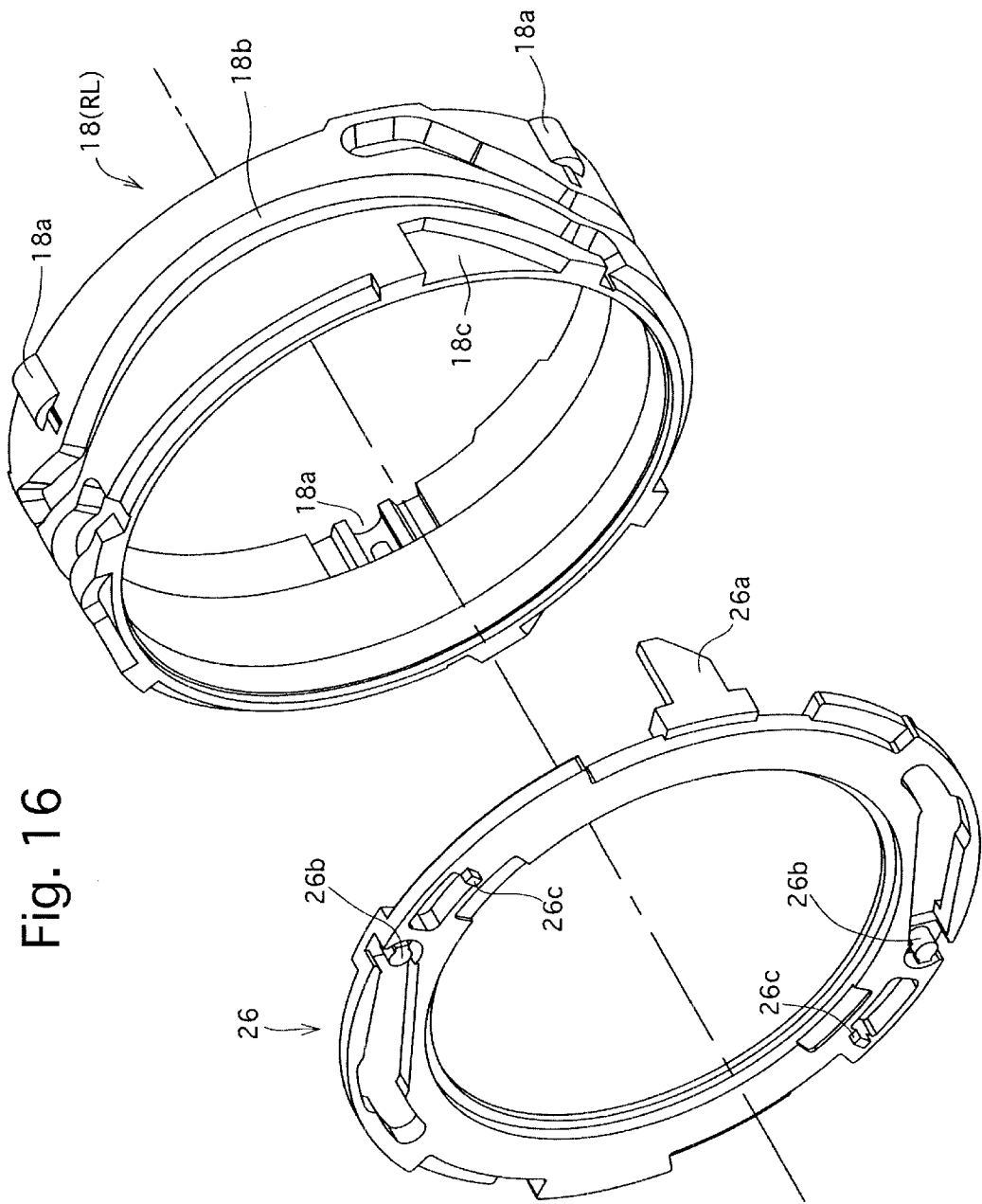
FIG. 16 is a perspective view of the second cam barrel and the barrier drive ring, showing the positional relationship between a driven lever which extends from the barrier drive ring and a rotation transfer recess formed on the second cam barrel.

The barrier drive ring 26 is provided on the front thereof with two protrusions 26*b*, while the external barrel 25 is provided in the vicinity of the front end thereof with corresponding two protrusions 25*c* (see FIGS. 16, 17 and 18). Two helical extension springs 28 are positioned between the external barrel 25 and the barrier drive ring 26 so that one and the other ends of one helical extension spring 28 are hooked on one of the two protrusions 26*b* and corresponding one of the two protrusions 25*c*, respectively, and one and the other ends of the other helical extension spring 28 are hooked on the other protrusion 26*b* and the other protrusion 25*c*, respectively. The spring force of each helical extension spring 28 is stronger than the spring force of each torsion spring 27*e*. The barrier drive ring 26 is constantly biased by the two helical extension springs 28 to rotate in the direction to open the two pairs of barrier blades 27*c* and 27*d*. The barrier drive ring 26 is provided on the front thereof with two protrusions 26*c* which can be respectively engaged with the two drive pins 27*h* of the rear pair of barrier blades 27*d* to open the two pairs of barrier blades 27*c* and 27*d*. When the barrier drive ring 26 is rotated to the rotational limit thereof by the spring force of the helical extension springs 28, each of the two protrusions 26*c* is engaged with the corresponding driven pin 27*h* to push the same in the direction to open the corresponding rear barrier blade 27*d* against the spring force of the corresponding torsion spring 27*e*, so that the corresponding front barrier blade 27*c* also opens via the engaging projection 27*i* thereof (see FIGS. 15A, 15B and 15C).

Figure 9:
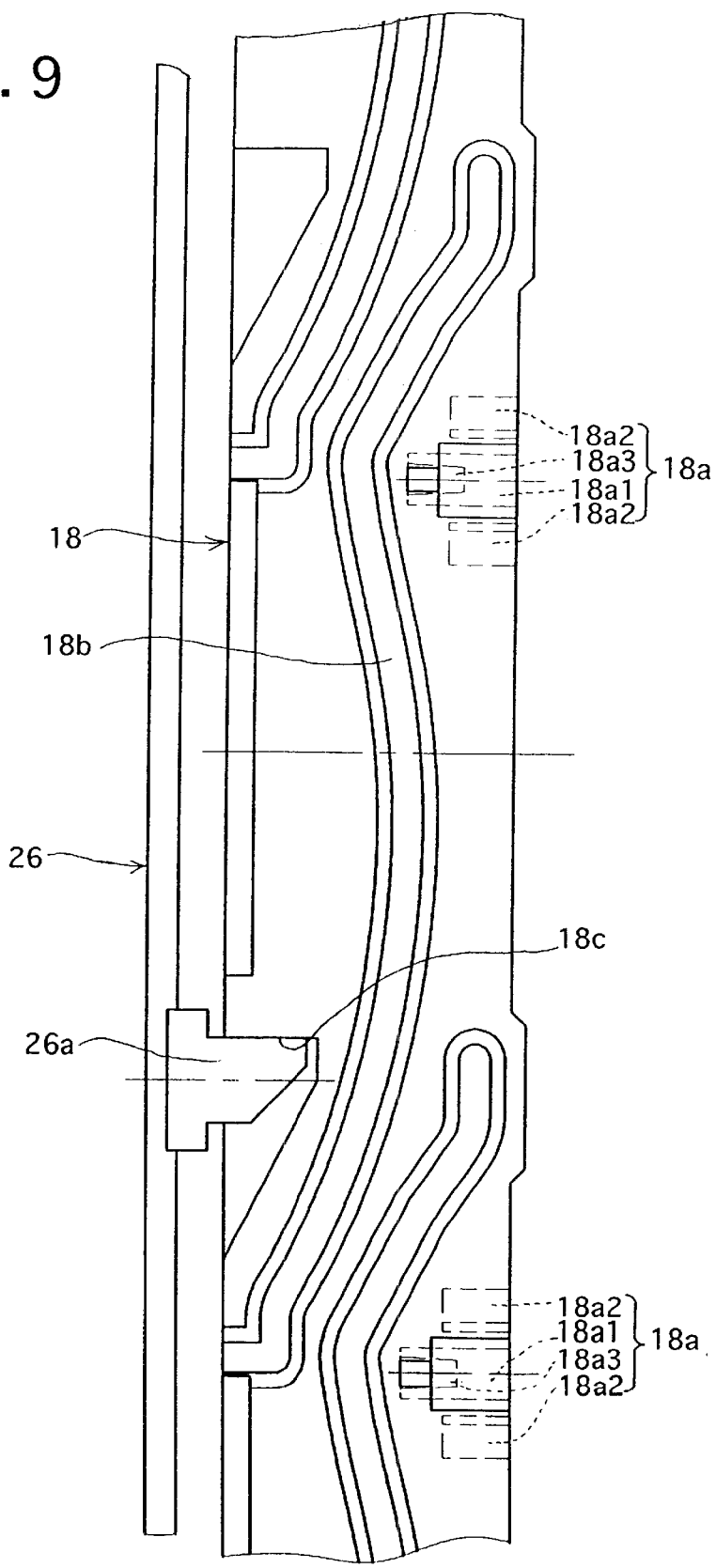
FIG. 9 is a developed view of the second cam barrel and the barrier drive ring, showing the positional relationship therebetween when the zoom lens is positioned in the accommodation position (when the power of the zoom lens is turned OFF)

On the other hand, the barrier drive ring 26 is provided with a driven lever 26*a* which extends from the rim of the barrier drive ring 26 toward the second cam barrel 18 to be engaged with, and disengaged from, a rotation transfer recess 18*c* formed on an outer peripheral surface of the second cam barrel 18 (see FIGS. 8, 9 and 16). Since the barrier drive ring 26 is supported by the external barrel 25 to be rotatable about the optical axis O relative to the external barrel 25, but immovable in the optical axis direction relative to the external barrel 25, the barrier drive ring 26 moves toward and away from the rotating second cam barrel 18 if the external barrel 25 linearly moves in the optical axis direction due to the engagement of the inward pins 25*b* of the external barrel 25 with the guide grooves 18*b* of the second cam barrel 18 as can be seen in FIGS. 8 and 9. The driven lever 26*a* and the rotation transfer recess 18*c* are apart from each other when positioned within a photographing range (i.e., between the telephoto extremity and the wide-angle extremity) as shown in FIG. 8. When the zoom barrel retreats from the telephoto extremity thereof to the accommodation position thereof, the driven lever 26*a* approaches the rotation transfer recess 18*c* and is then engaged with the rotation transfer recess 18*c* to apply a force to the barrier drive ring 26 to rotate the same in the direction to close the two pairs of barrier blades 27*c* and 27*d*. When the barrier drive ring 26 rotates to the rotational limit thereof against the spring force of the helical extension springs 28, each of the protrusions 26*c* of the barrier drive ring 26 disengages from the drive pins 27*h* of the corresponding rear barrier blade 27*d*. As a result, each of the rear pair of barrier blades 27*d* closes by the spring force of the corresponding torsion spring 27*e*, so that each of the front pair of barrier blades 27*c* also closes via the corresponding engaging projections 27*j* and 27*k* to thereby close the photographic aperture 27*a* (see FIG. 14). Conversely, when the zoom barrel advances from the accommodation position thereof to the telephoto extremity thereof, the driven lever 26*a* moves forwards and then disengages from the rotation transfer recess 18*c* to thereby allow the barrier drive ring 26 to rotate in the direction to open the two pairs of barrier blades 27*c* and 27*d* by the spring force of the helical extension springs 28. As a result, each of the protrusions 26*c* of the barrier drive ring 26 is engaged with the drive pin 27*h* of the corresponding rear barrier blade 27*d* to push the same in the direction to open the corresponding front barrier blade 27*c* via the corresponding engaging projection 27*i* to thereby open the two pairs of barrier blades 27*c* and 27*d*. Accordingly, as can be understood by the above description, the two pairs of barrier blades 27*c* and 27*d* are driven to open and close by rotation of the barrier drive ring 26. It should be noted that the barrier drive ring 26 has only one driven lever 26a, whereas the second cam barrel 18 has three rotation transfer recesses 18c formed at 120° intervals about the axis of the second cam barrel 18. One rotation transfer recess 18c which is actually used is freely selected from the three rotation transfer recesses 18c during assembly.

Figure 10:
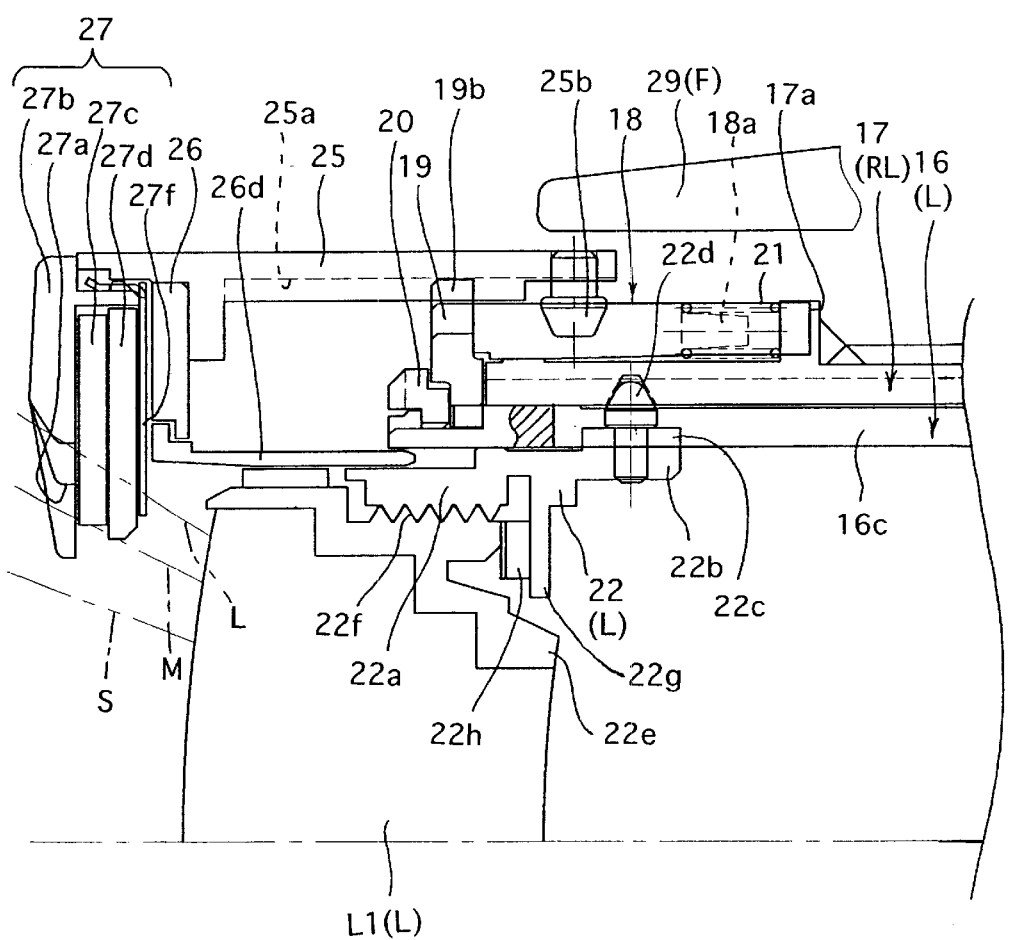
FIG. 10 is an axial cross sectional view of the zoom lens show in FIG. 1, showing the zoom lens above the optical axis thereof, showing the positional relationship between an external barrel and the second cam barrel (a first lens group) when the zoom lens is set at the wide-angle extremity thereof.
Figure 11:
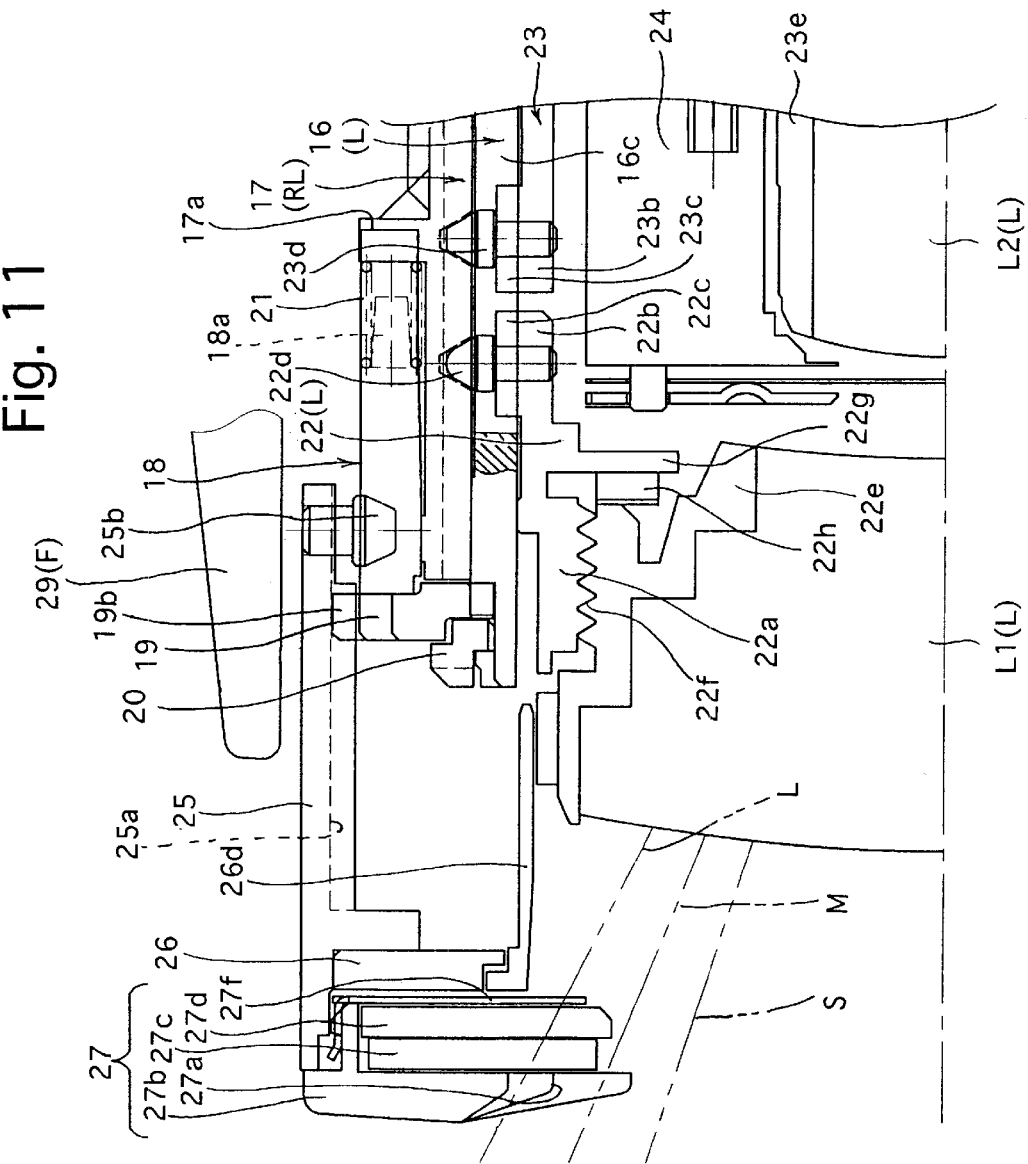
FIG. 11 is an axial cross sectional view of the zoom lens show in FIG. 1, showing the zoom lens above the optical axis thereof, and showing the positional relationship between the external barrel and the second cam barrel (the first lens group) when the zoom lens is set at the telephoto extremity thereof.
Figure 12:
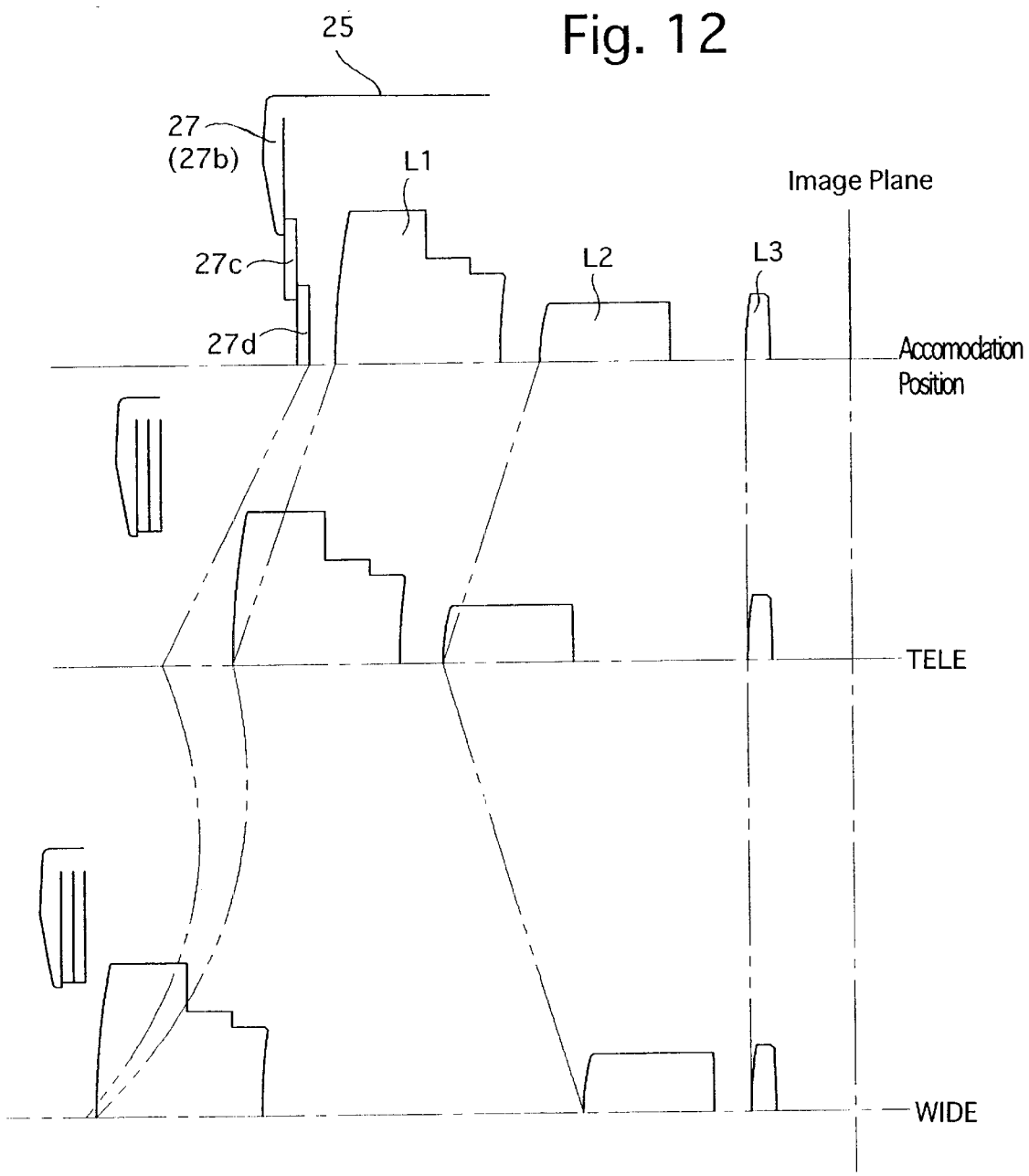
FIG. 12 is an explanatory view showing variations in axial position of the sensitive surface (image plane) of a CCD, the first lens group, a second lens group, and a barrier block when the zoom lens is driven from the accommodation position to the telephoto extremity and thereafter to the wide-angle extremity.

The external barrel 25 that is guided in the optical axis direction moves forward and rearward in the optical axis direction by rotation of the second cam barrel 18 in the above described manner. On the other hand, the first and second lens groups L1 and L2 move forward and rearward in the optical axis direction by rotation of the first cam barrel 17. FIG. 12 shows the axial position of the sensitive surface (image plane) of the CCD 12a on which subject images are formed through the photographic optical system, and the variations in the axial positions of the first lens group L1 (the principal point of the first lens group L1), the second lens group L2 (the principal point of the first lens group L2), and the barrier block 27 fixed to the front end of the external barrel 25 (more specifically, the photographic aperture 27a formed on the panel 27b of the barrier block 27), when the zoom lens is driven from the accommodation position to the wide-angle extremity via the telephoto extremity. The contours of the first and second cam grooves 17C1 and 17C2 of the first cam barrel 17 and the guide grooves 18b of the second cam barrel 18 are determined so that the first lens group L1, the second lens group L2 and the barrier block 27 move in the optical axis direction to have the moving paths shown in FIG. 12. The photographic aperture 27a has a generally rectangular shape as viewed from the front of the digital camera. The angle of view in the diagonal direction of the photographic aperture 27a is greater than the angle of view in the lateral (horizontal) direction of the photographic aperture 27a, while the angle of view in the lateral direction of the photographic aperture 27a is greater than the angle of view in the longitudinal (vertical) direction of the photographic aperture 27a. In FIG. 10, an incident light ray S on the zoom lens along the angle of view in the longitudinal direction of the photographic aperture 27a, an incident light ray M on the zoom lens along the angle of view in the lateral direction of the photographic aperture 27a, and an incident light ray L on the zoom lens along the angle of view in the diagonal direction of the photographic aperture 27a are shown by two-dot chain lines.

A light shield barrel 26d which extends from the inner edge of the barrier drive ring 26 to the front end of the outer peripheral surface of the first lens frame 22 is adhered to the inner edge of the barrier drive ring 26 by an adhesive. The light shield barrel 26d is rotationally symmetrical about the optical axis O, so that the shielding characteristics of the light shield barrel 26d do not vary even if the light shield barrel 26d rotates forwardly and reversely together with the barrier drive ring 26 about the optical axis O.

Almost all the above mentioned elements of the zoom lens except for each spring, the feed screw 10e, the set screws 23f, the follower pins 22d, the follower pins 23d, the shutter block 24, the radially inward pins 25b, the flexible coding plate 14 and the brush 15 are made of synthetic resin. Although each lens element of the first, second and third lens groups L1, L2 and L3 can be made of a plastic, at least the frontmost lens element is preferably a glass lens for the purpose of preventing the front surface of the first lens group L1 from being scratched.

In the above illustrated embodiment, although the third lens group L3 functions as focusing lens group, the zoom lens can be modified so that the first lens group L1 or the second lens group L2 functions as focusing lens group. In the case where the second lens group L2 functions as focusing lens group, the shutter block can be modified to have an auto-focusing function. Such a shutter block is well-known in the art.

Figure 19:
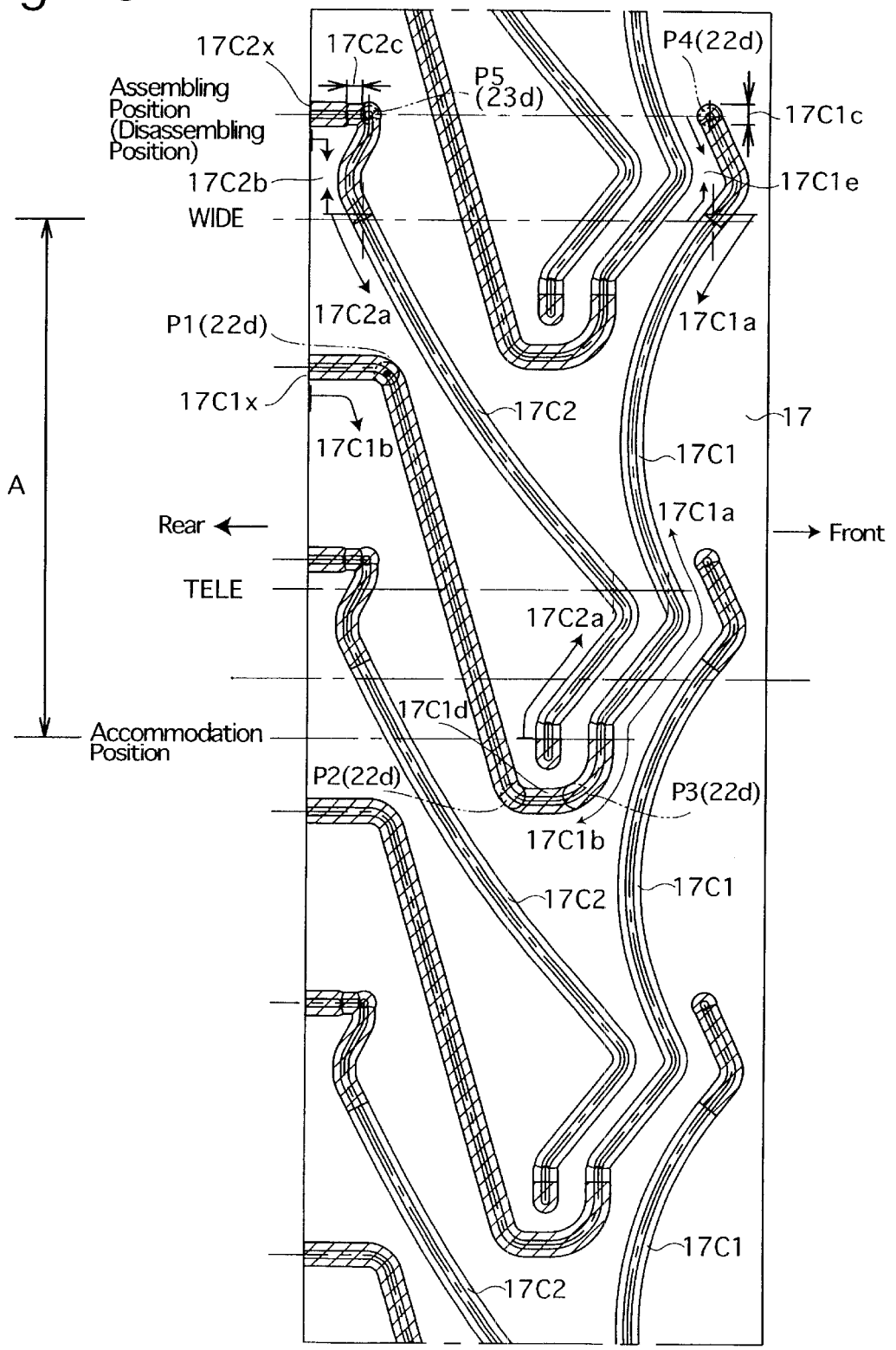
FIG. 19 is a developed view of the inner peripheral surface of the first cam barrel, showing the contours of first and second cam grooves formed on the inner peripheral surface of the first cam barrel.

As has been described above, each of the first and second lens groups L1 and L2 moves between the telephoto extremity (TELE) thereof and the wide-angle extremity (WIDE) thereof in the optical axis direction in accordance with the contours of the corresponding first or second cam grooves 17C1 or 17C2 when the zoom lens is in operation. The contours of the first and second cam grooves 17C1 and 17C2 will be hereinafter discussed in detail with reference to FIG. 19. FIG. 19 is identical to FIG. 3 except that FIG. 19 includes reference numerals which designate characteristic portions of the cam grooves 17C1 and 17C2. In FIG. 19, the right and left sides of the drawing correspond to the front and rear sides of the zoom lens in the optical axis direction, respectively. Although three first cam grooves 17C1 and three second cam grooves 17C2 are formed on the first cam barrel 17, only one first cam groove 17C1 and only one second cam groove 17C2, which are adjacent to each other in a circumferential direction of the first cam barrel 17, will be hereinafter discussed since the e contours of all the three first cam grooves 17C1 are the same and the contours of all the three second cam grooves 17C2 are the same.

As can be seen in FIG. 19, operational sections 17C1a and 17C2a of the first and second cam grooves 17C1 and 17C2 which are used when the zoom lens is used within a range, corresponding to the angle of rotation "A" shown in FIGS. 3 and 19, are formed in the same range in a circumferential direction on of the first cam barrel 17. Each of the operational sections 17C1a and 17C2a includes a zoom section (focal length varying section) which extends from the wide-angle position to the telephoto position, and an accommodation section from the telephoto position to the accommodation position.

Hatched sections of the first and second cam grooves 17C1 and 17C2 are assembly-cam portions which are used only during assembly of the zoom lens. In other words, hatched sections of the first and second cam grooves 17C1 and 17C2 are not used during operation of the zoom lens. The first cam groove 17C1 has two hatched sections: a leading section 17C1b which extends from a cam follower insertion opening 17C1x of the first cam groove 17C1 that is open at the rear end of the first cam barrel 17 to the accommodation position of the first cam groove 17C1, and a terminal section 17C1e which extends from the wide-angle position of the first cam groove 17C1 to the cam dead end 17C1c thereof. The second cam groove 17C2 has a leading section 17C2b which extends from a cam follower insertion opening 17C2x of the second cam groove 17C2 that is open at the rear end of the first cam barrel 17 to the wide-angle position of the second cam groove 17C2.

The cam dead end 17C1c of the first cam groove 17C1 and the cam follower insertion opening 17C2x of the second cam groove 17C2 are formed at the same circumferential position in a circumferential direction of the first cam barrel 17. The cam follower insertion opening 17C1x of the first cam groove 17C1 and the cam follower insertion opening 17C2x of the second cam groove 17C2 are formed at different circumferential positions in a circumferential direction of the first cam barrel 17.

The leading section 17C2b of the second cam groove 17C2, which extends from the cam follower insertion opening 17C2x to the wide-angle position of the second cam groove 17C2, is smaller than the remaining portion of the second cam groove 17C2. Operational section (non-hatched section shown in FIG. 19) 17C2a of the second cam groove 17C2 firstly extends in a direction oblique and forward in the optical axis direction from the wide-angle position of the second cam groove 17C2, in the vicinity of the rear end of the first cam barrel 17, to a turning point in the vicinity of the telephoto position of the second cam groove 17C2, and subsequently extends in a direction oblique and rearward in the optical axis direction from the turning point to the accommodation position of the second cam groove 17C2.

The first cam groove 17C1 is formed so as to extend around opposite sides of the operational section 17C2a, with respect to the optical axis direction, of the second cam groove 17C2. A major part of the leading section 17C1b of the first cam groove 17C1, which is positioned behind the operational section 17C2a of the second cam groove 17C2, extends linearly in a direction oblique and forward in the optical axis direction approximately parallel the operational section 17C2a of the second cam groove 17C2 from the rear side of the first cam barrel 17. The leading section 17C1b of the first cam groove 17C1 is provided with a U-shaped turning section 17C1d which extends around the cam dead end of the second cam groove 17C2 so that the first cam groove 17C1 can extend from the rear (the left side as viewed in FIG. 19) of the second cam groove 17C2 to the front (the right side as viewed in FIG. 19) of the second cam groove 17C2 without intersecting the second cam groove 17C2. Accordingly, the leading section 17C1b is formed on the first cam barrel 17 so as to detour around the second cam groove 17C2 and not to overlap the second cam groove 17C2.

In the first cam groove 17C1, the accommodation position is positioned between the U-shaped turning section 17C1d and the operational section 17C1a which includes the zoom section extending between the telephoto position and the wide-angle position. The operational section 17C1a, which extends between the accommodation position of the first cam groove 17C1 and the wide-angle position of the first cam groove 17C1, is positioned in front of the operational section 17C2a of the second cam groove 17C2 and extends circumferentially to have a predetermined cam path. The terminal section 17C1e, which is not used during operation of the zoom lens, extends from the wide-angle position of the first cam groove 17C1 to the cam dead end 17C1c thereof. As has been described above, the cam dead end 17C1c, which is positioned at one end of the terminal section 17C1e, and the cam follower insertion opening 17C2x of the second cam groove 17C2 are formed at the same circumferential position in a circumferential direction of the first cam barrel 17.

Accordingly, regarding the first cam groove 17C1, the operational section 17C1a that includes the zoom section is formed in front of the operational section 17C2a of the second cam groove 17C2 in the optical axis direction, while a major part of the leading section 17C1b that includes the cam follower insertion opening 17C1x is formed behind the operational section 17C2a of the second cam groove 17C2 in the optical axis direction. The operational section 17C1a and the leading section 17C1b are connected to each other via the U-shaped turning section 17C1d, which is formed as part of the leading section 17C1b so that the leading section 17C1b does not to overlap the second cam groove 17C2.

The second cam groove 17C2 is further provided, in the middle of the leading section 17C2b adjacent to a bend thereof, with a stop section 17C2c whose depth is smaller than that of the zoom section of the second cam groove 17C2 in a radial direction of the first cam barrel 17. When one follower pin 23d is fitted in the associated second cam groove 17C2, at least in the zoom section thereof, a constant force is exerted upon the follower pin 23d radially outwards so that the follower pin 23d is fitted in the associated second cam groove 17C2 without play. Such a constant force is exerted upon the follower pin 23d by a resilient deformation of the associated resilient extending piece 23b radially inwards when the follower pin 23d is fitted in the associated second cam groove 17C2, at least in the zoom section thereof. When the follower pin 23d passes the stop section 17C2c, whose depth is smaller than that of the zoom section of the second cam groove 17C2 in a radial direction of the first cam barrel 17, the sliding resistance between the follower pin 23d and the second cam groove 17C2 increases since the amount of the resilient deformation of the associated resilient extending piece 23b radially inwards increases. Therefore, when the follower pin 23d is in the second cam groove 17C2 on the side of the cam dead end thereof beyond the stop section 17C2c, the stop section 17C2c prevents the follower pin 23d from accidentally moving toward the cam follower insertion opening 17C2x beyond the stop section 17C2c.

An operation of coupling the first and second lens frames 22 and 23 to the linear guide barrel 16 and the first cam barrel 17 will be hereinafter discussed. Initially, the linear guide barrel 16 and the first cam barrel 17 are connected to each other with the use of the linear guide ring 19 and the retainer ring 20, so that the linear guide barrel 16 and the first cam barrel 17 are relatively immovable in the optical axis and relatively rotatable about the optical axis O. Subsequently, the linear guide barrel 16 and the first cam barrel 17 are rotated relative to each other so that the three cam follower insertion openings 17C1x of the first cam grooves 17C1 and the three linear guide slots 16c are respectively aligned radially.

Thereafter, the first lens frame 22 is inserted into the linear guide barrel 16 from the rear end thereof in a state where the three square projections (linear guide projection) 22c and the three follower pins 22d are positioned in alignment with the three linear guide slots 16c and the three cam follower insertion openings 17C1x of the first cam grooves 17C1 in a circumferential position about the optical axis direction, respectively. At this time, the three follower pins 22d are respectively inserted into the three first cam grooves 17C1, and each follower pin 22d moves to a point P1 (see FIG. 19) on the leading section 17C1b. At the same time, the three square projections 22c are respectively inserted into the three linear guide slots 16c so that the first lens frame 22 is guided in the optical axis direction without rotating about the optical axis O.

Subsequently, the linear guide barrel 16 and the first cam barrel 17 are rotated relative to each other until each follower pin 22d reaches a point P2 (see FIG. 19) on the leading section 17C1b (17C1d). This relative rotation between the linear guide barrel 16 and the first cam barrel 17 causes the first lens frame 22 to move in the optical axis direction without rotating about the optical axis O in accordance with the contours of the first cam grooves 17C1 since the square projections 22c of the first lens frame 22 are guided by the three linear guide slots 16c in the optical axis direction without rotating about the optical axis O. After each follower pin 22d has reached the point P2 on the leading section 17C1b, the first lens frame 22 is pushed into the linear guide barrel 16 forwardly until each follower pin 22d reaches a point P3 (see FIG. 19) on the leading section 17C1b (17C1d). Subsequently, the linear guide barrel 16 and the first cam barrel 17 are rotated relative to each other until each follower pin 22d reaches a point P4 (see FIG. 19) which corresponds to the cam dead end 17C1c of the first cam groove 17C1. The direction of relative rotation between the linear guide barrel 16 and the first cam barrel 17 when each follower pin 22d is moved from point P3 to P4 is opposite to the direction of relative rotation between the linear guide barrel 16 and the first cam barrel 17 when each follower pin 22d is moved from the point P1 to the point P2.

Subsequently, the second lens frame 23 is inserted into the linear guide barrel 16 from the rear end thereof in a state where the three square projections (linear guide projection) 23c and the three follower pins 23d are positioned in alignment with the three linear guide slots 16c and the three cam follower insertion openings 17C2x of the second cam grooves 17C2 in a circumferential position about the optical axis direction, respectively. Although one square projection 22c of the first lens frame 22 and one square projection 23c of the second lens frame 23 are fitted in a common linear guide slot 16c to be guided linearly, the linear guide barrel 16 and the first cam barrel 17 are positioned relative to each other so that the three cam follower insertion openings 17C2x of the second cam grooves 17C2 and the three linear guide slots 16c are respectively aligned radially when each follower pin 22d is positioned at the point P4 (the cam dead end 17C1c) on the corresponding first cam groove 17C1. This is due to the above described cam design wherein the cam dead end 17C1c of one first cam groove 17C1 and the cam follower insertion opening 17C2x of the corresponding second cam groove 17C2 are formed at the same circumferential position in a circumferential direction of the first cam barrel 17, namely, aligned about the optical axis.

Accordingly, in a state where each follower pin 22d is positioned at the point P4 (the cam dead end 17C1c) on the corresponding first cam groove 17C1, the three follower pins 23d of the second lens frame 23 can be respectively inserted into the three second cam grooves 17C2, and at the same time, the three square projections 23c of the second lens frame 23 can be respectively inserted into the three linear guide slots 16c. The second lens frame 23 is pushed into the linear guide barrel 16 forwardly until each follower pin 23d reaches a point P5 (see FIG. 19) on the second cam groove 17C2 beyond the stop section 17C2c thereof.

Subsequently, the linear guide barrel 16 and the first cam barrel 17 are rotated relative to each other until each follower pin 23d reaches the cam dead end of the second cam groove 17C2. This relative rotation between the linear guide barrel 16 and the first cam barrel 17 causes the second lens frame 23 to move in the optical axis direction in accordance with the contours of the second cam grooves 17C2 without rotating about the optical axis O since the three square projections 23c of the second lens frame 23 are guided by the three linear guide slots 16c in the optical axis direction without rotating about the optical axis O.

In a state where the three follower pins 23d have reached the cam dead end positions of the second cam grooves 17C2 by the relative rotation between the linear guide barrel 16 and the first cam barrel 17, each follower pin 22d is positioned at the accommodation position of the corresponding first cam groove 17C1, while each follower pin 23d is positioned at the accommodation position of the corresponding second cam groove 17C2, so that each of the first and second lens frames 22 and 23 is held at the accommodation position thereof in the zoom lens in the optical axis direction.

An operation of removing the first and second lens frames 22 and 23 from the linear guide barrel 16 and the first cam barrel 17 is the reverse of the aforementioned operation of coupling the first and second lens frames 22 and 23 to the linear guide barrel 16 and the first cam barrel 17. Therefore, firstly each follower pin 23d of the second lens frame 23 is moved to the point P5 on the second cam groove 17C2 and subsequently the second lens frame 23 is removed from the rear end of the linear guide barrel 16. Thereafter, each follower pin 22d of the first lens frame 22 is moved to the point P1 on the first cam groove 17C1, and subsequently the first lens frame 22 is removed from the rear end of the linear guide barrel 16.

In regard to the second cam grooves 17C2, the follower pins 23d of the second lens frame 23 do not accidentally come off the second cam grooves 17C2 since the stop section 17C2c is formed immediately in front of each of the three cam follower insertion openings 17C2x in the optical axis direction. Since the follower pins 23d do not accidentally come off the second cam grooves 17C2, the second lens frame 23 does not come off the linear guide barrel 16 and the first cam barrel 17. Since the second lens frame 23 does not accidentally come off the linear guide barrel 16 and the first cam barrel 17, the first lens frame 22, which is positioned in front of the second lens group 23 and which uses the three linear guide grooves 16 together with the second lens frame 23, does not accidentally come off the linear guide barrel 16 and the first cam barrel 17 either. When the second lens frame 23 is removed from the linear guide barrel 16 and the first cam barrel 17, each follower pin 23d only needs to be moved to the cam follower insertion opening 17C2x beyond the stop section 17C2c while each resilient extending piece 23b is deformed radially inwards a little further after each follower pin 23d reaches the stop section 17C2c.

Accordingly, if an assemblage of the first cam barrel 17, the linear guide barrel 16, the first lens frame 22 and the second lens frame 23 is regarded as a subassembly of the zoom lens, a state of completion of the subassembly is maintained with the stop section 17C2c provided in each of the three second cam grooves 17C2, which improves the workability of the assembly task of the subassembly.

As can be understood by the above description, according to the present embodiment of the zoom lens, it is unnecessary to readjust the relative rotational position between the linear guide barrel 16 and the first cam barrel 17 so that the three cam follower insertion openings 17C2x of the second cam grooves 17C2 and the three linear guide slots 16c are respectively aligned in a circumferential position about the optical axis when the second lens frame 23 is coupled to the linear guide barrel 16 and the first cam barrel 17, after the first lens frame 22 has been coupled to the linear guide barrel 16 and the first cam barrel 17, since the cam dead end 17C1c of the first cam groove 17C1 and the cam follower insertion opening 17C2x of the second cam groove 17C2 are formed at the same circumferential position in a circumferential direction of the first cam barrel 17, and since the second lens frame 23 is coupled to the linear guide barrel 16 and the first cam barrel 17 in a state where each follower pin 22d of the first lens frame 22 is positioned at the cam dead end 17C1c on the corresponding first cam groove 17C1. This results in an improved assembly operation. In other words, since the relative rotational position between the linear guide barrel 16 and the first cam barrel 17 (the variable relative angle of rotation between the cam follower insertion openings 17C2x of the second cam groove 17C2 and the three linear guide slots 16c of the linear guide barrel 16) in a state where each follower pin 22d of the first lens frame 22 is positioned at the cam dead end 17C1c on the corresponding first cam groove 17C1 corresponds to the relative angular position between the follower pins 23d and the square projections 23c that is predetermined as a fixed value, it is unnecessary to readjust the relative rotational position between the linear guide barrel 16 and the first cam barrel 17 so that the three cam follower insertion openings 17C2x of the second cam grooves 17C2 and the three linear guide slots 16c are respectively aligned radially when the second lens frame 23 is coupled to the linear guide barrel 16 and the first cam barrel 17 after the first lens frame 22 has been coupled to the linear guide barrel 16 and the first cam barrel 17. Although each first cam groove 17C1 is formed so that the leading section 17C1b (which includes the cam follower insertion opening 17C1x) and the operational section 17C1a (which includes the zoom section) are formed on opposite sides of the operational section 17C2a of the second cam groove 17C2 in the optical axis direction, the above described assembling operation can be achieved since the leading section 17C1b is formed on the first cam barrel 17 to detour around the second cam groove 17C2 so as not to overlap the second cam groove 17C2.

In the above illustrated embodiment, the follower pins 22d and 23d are respectively positioned at the same circumferential locations as the square projections 22c and 23c in a circumferential direction, while one square projection 22c and one square projection 23c are fitted in the common linear guide slot 16c to be guided linearly. This structure contributes to reducing the number of the linear guide slots 16c. Furthermore, due to this structure, it is unnecessary to provide the linear guide barrel 16 with a further three slots, in addition to the three linear guide slot 16c, by which the three follower pins 22d and three follower pins 23d would be engaged with the three first cam grooves 17C1 and the three second cam grooves 17C2, respectively. Therefore, sufficient strength of the linear guide barrel 16 can be maintained, and the linear guide barrel 16 can be manufactured easily.

However the present invention is not limited solely to the above illustrated embodiment. For instance, in a viewpoint of improvement in ease of assembly of the zoom lens, the first and second lens frames 22 and 23 do not have to use the same linear guide slots 16c, and the three follower pins (22d or 23d) and the three square projections (22c or 23c) which are formed on each of the first and second lens frames 22 and 23 can be respectively formed at different circumferential positions. In other words, as mentioned above, the relative rotational position between the follower insertion opening 17C2x of the corresponding second cam groove 17C2 and the linear guide slot 16c, when each follower pin 22d of the first lens frame 22 is positioned at the cam dead end 17C1c on the corresponding first cam groove 17C1, only needs to correspond to the relative rotational position between the follower pin 23d of the second lens group 23 and the square projections 23c.

As can be understood from the foregoing, according to the present invention, a zoom lens having a cam mechanism which makes it easy to couple more than one lens frame to the cam barrel can be obtained.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom lens comprising:
   a cam barrel driven to rotate about an optical axis;
   a first cam groove and second cam groove formed on an inner peripheral surface of said cam barrel, said first cam groove and second cam groove having different profiles;
   a first lens frame having a first cam follower which is engaged with said first cam groove; and
   a second lens frame having a second cam follower which is engaged with said second cam groove;
   wherein said first cam groove comprises:
      a first zoom section for moving said first lens frame between a telephoto position thereof and a wide-angle position thereof in accordance with a rotation of said cam barrel;
      a first leading section for leading said first cam follower from a first cam follower insertion opening, which is open at an end of said cam barrel, to said first zoom section; and
      a cam dead end positioned on the opposite side of said first zoom section with respect to said first leading section, wherein said first cam follower does not enter said cam dead end during operation of said zoom lens;
   wherein said second cam groove comprises:
      a second zoom section for moving said second lens frame between a telephoto position thereof and a wide-angle position thereof in accordance with said rotation of said cam barrel; and
      a second leading section for leading said second cam follower from a second cam follower insertion opening, which is open at an end of said cam barrel, to said second zoom section;
   wherein said cam dead end of said first cam groove and said second cam follower insertion opening of said second cam groove are formed at the same circumferential position in a circumferential direction of said cam barrel, and
   wherein, upon assembly of said first lens frame and said second lens frame to said cam barrel, said first cam follower is inserted into said first leading section via said first cam follower insertion opening, and subsequently, said second cam follower is inserted into said second leading section via said second cam follower insertion opening.

2. The zoom lens according to claim 1, wherein said first cam follower, said second cam follower, said first cam groove, and said second cam groove respectively comprise a plurality of first cam followers, a plurality of second cam followers, a plurality of first cam grooves and, a plurality of second cam grooves, respectively provided at an equiangular distance.

3. The zoom lens according to claim 1, further comprising a linear guide barrel which is positioned inside said cam barrel so as to guide said first lens frame and second lens frame in said optical axis direction, said linear barrel being provided with a linear guide slot extending parallel to said optical axis;
   wherein said first lens frame comprises a first guide projection and said second lens frame comprises a second guide projection, said first guide projection and said second guide projection being engaged with said linear guide slot at different locations therein with respect to said direction of said optical axis;
   wherein said first guide projection is formed on said first lens frame at the same circumferential position as said first cam follower;
   wherein said second guide projection is formed on said second lens frame at the same circumferential position as said second cam follower;
   wherein said first cam follower passes through said linear guide slot to be fitted in said first cam groove; and wherein said second cam follower passes through said linear guide slot to be fitted in said second cam groove.

4. The zoom lens according to claim 3, wherein said first lens frame comprises a first resilient extending piece which extends in said direction of said optical axis to be elastically deformable in an inward radial direction;
   wherein said first guide projection is formed on said first resilient extending piece to extend radially outwards to be engaged with said linear guide slot;
   wherein said first cam follower is fixed to said first guide projection to extend radially outwards to be engaged with said first cam groove via said linear guide slot;
   wherein said second lens frame comprises a second resilient extending piece which extends in said direction of said optical axis to be elastically deformable in an inward radial direction;
   wherein said second guide projection is formed on said second resilient extending piece to extend radially outwards to be engaged with said linear guide slot; and
   wherein said second cam follower is fixed to said second guide projection to extend radially outwards to be engaged with said second cam groove via said linear guide slot.

5. The zoom lens according to claim 3, wherein said linear guide slot comprises a plurality of linear guide slots,
   wherein said first guide projection and second guide projection respectively comprise a plurality of first guide projections and a plurality of second guide projections, respectively equal to the number of said plurality of linear guide slots, and
   wherein each of said first guide projections and corresponding one of said second guide projections are engaged with a common linear guide slot of said linear guide slots.

6. The zoom lens according to claim 3, wherein said linear guide barrel and said cam barrel are connected to each other to be relatively immovable in said direction of said optical axis and relatively rotatable about said optical axis.

7. The zoom lens according to claim 1, wherein said first cam groove further comprises a first accommodation section positioned between said first zoom section and said first leading section;
   wherein said second cam groove further comprises a second accommodation section formed on the opposite side of said second zoom section with respect to said second leading section; and
   wherein said first accommodation section and said second accommodation section are positioned in the same range in a circumferential direction of said cam barrel.

8. The zoom lens according to claim 1, wherein said second cam groove further comprises a stop section, wherein the depth of said stop section is smaller than the depth of said second zoom section in a radial direction of said cam barrel;
   wherein said stop section is positioned in the middle of said second leading section to prevent said second cam follower from moving beyond said stop section, toward said cam follower insertion opening, when said second cam follower is fitted in said second cam groove.

9. The zoom lens according to claim 1, wherein said zoom lens is incorporated in a digital camera.

10. A zoom lens comprising:
   a cam barrel driven to rotate about an optical axis;
   a first cam groove and second cam groove formed on an inner peripheral surface of said cam barrel, said first cam groove and second cam groove having different profiles;
   a first lens frame having a first cam follower which is engaged with said first cam groove;
   a second lens frame having a second cam follower which is engaged with said second cam groove; and
   a linear guide barrel which is associated with said first lens frame and said second lens frame so as to guide said first lens frame and said second lens frame in a direction of said optical axis;
   wherein said first cam groove comprises:
      a first zoom section for moving said first lens frame between a telephoto position thereof and a wide-angle position thereof in accordance with a rotation of said cam barrel;
      a first leading section for leading said first cam follower from a first cam follower insertion opening, which is open at an end of said cam barrel, to said first zoom section; and
      a cam dead end positioned on the opposite side of said first zoom section with respect to said first leading section, wherein said first cam follower does not enter said cam dead end during operation of said zoom lens;
   wherein said second cam groove comprises:
      a second zoom section for moving said second lens frame between a telephoto position thereof and a wide-angle position thereof in accordance with said rotation of said cam barrel; and
      a second leading section for leading said second cam follower from a second cam follower insertion opening, which is open at an end of said cam barrel, to said second zoom section;
   wherein said cam dead end of said first cam groove and said second cam follower insertion opening of said second cam groove are formed at the same circumferential position in a circumferential direction of said cam barrel, and
   wherein, upon assembly of said first lens frame and said second lens frame to said cam barrel and said linear guide barrel, said first cam follower is inserted into said first leading section via said first cam follower insertion opening, said linear guide barrel and said cam barrel are rotated relative to each other until said first cam follower reaches said cam dead end of said first cam groove, and subsequently, said second cam follower is inserted into said second leading section via said second cam follower insertion opening.

11. The zoom lens according to claim 10, wherein said zoom lens is incorporated in a digital camera.

12. A zoom lens comprising:
   a cam barrel driven to rotate about an optical axis;
   a first cam groove and a second cam groove formed on an inner peripheral surface of said cam barrel, said first cam groove and second cam groove having different profiles;
   a first lens frame having a first cam follower which is engaged with said first cam groove;
   a second lens frame having a second cam follower which is engaged with said second cam groove; and
   a linear guide barrel which is associated with said first lens frame and said second lens frame so as to guide said first lens frame and said second lens frame in a direction of said optical axis;
   wherein said linear guide barrel is positioned inside said cam barrel and comprises a linear guide slot extending parallel to said optical axis;

wherein said first lens frame comprises a first guide projection which is engaged with said linear guide slot;

wherein said second lens frame comprises a second guide projection which is engaged with said linear guide slot;

wherein said first cam groove comprises:
- a first zoom section for moving said first lens frame between a telephoto position thereof and a wide-angle position thereof in accordance with a rotation of said cam barrel;
- a first leading section for leading said first cam follower from a first cam follower insertion opening, which is open at an end of said cam barrel, to said first zoom section; and
- a cam dead end positioned on the opposite side of said first zoom section with respect to said first leading section, wherein said first cam follower does not enter said cam dead end during operation of said zoom lens;

wherein said second cam groove comprises:
- a second zoom section for moving said second lens frame between a telephoto position thereof and a wide-angle position thereof in accordance with said rotation of said cam barrel; and
- a second leading section for leading said second cam follower from a second cam follower insertion opening, which is open at an end of said cam barrel, to said second zoom section;
- wherein said second cam follower insertion opening and said linear guide slot are positioned to correspond to said second cam follower and said second guide projection, respectively, in a circumferential direction, when said first cam follower is positioned at said cam dead end of said first cam groove.

13. The zoom lens according to claim 12, wherein said cam dead end and said second cam follower insertion opening are formed at the same circumferential position in a circumferential direction of said cam barrel.

14. The zoom lens according to claim 13, wherein said linear guide slot is formed to penetrate through said linear guide barrel radially, wherein said first guide projection and said second guide projection are engaged with said linear guide slot at different locations therein in said direction of said optical axis, wherein said first guide projection is formed on said first lens frame at the same circumferential position as said first cam follower;

wherein said second guide projection is formed on said second lens frame at the same circumferential position as said second cam follower;

wherein said first cam follower is fitted in said first cam groove via said linear guide slot, and wherein said second cam follower is fitted in said second cam groove via said linear guide slot.

15. The zoom lens according to claim 12, wherein said first lens frame comprises a first resilient extending piece which extends in said direction of said optical axis to be elastically deformable radially inwards, wherein said first guide projection is formed on said first resilient extending piece to extend radially outwards to be engaged with said linear guide slot;

wherein said first cam follower is fixed to said first guide projection to extend radially outwards to be engaged with said first cam groove via said linear guide slot;

wherein said second lens frame comprises a second resilient extending piece which extends in said direction of said optical axis to be elastically deformable radially inwards, wherein said second guide projection is formed on said second resilient extending piece to extend radially outwards to be engaged with said linear guide slot; and wherein said second cam follower is fixed to said second guide projection to extend radially outwards to be engaged with said second cam groove via said linear guide slot.

16. The zoom lens according to claim 12, wherein said first cam groove further comprises a first accommodation section positioned between said first zoom section and said first leading section, wherein said second cam groove further comprises a second accommodation section formed on the opposite side of said second zoom section with respect to said second leading section, and wherein said first accommodation section and said second accommodation section are positioned in the same range in a circumferential direction of said cam barrel.

17. The zoom lens according to claim 12, wherein said second cam groove further comprises a stop section, the depth thereof being smaller than the depth of said second zoom section in a radial direction of said cam barrel, wherein said stop section is positioned in the middle of said second leading section to prevent said second cam follower from moving toward said cam follower insertion opening beyond said stop section when said second cam follower is fitted in said second cam groove.

18. The zoom lens according to claim 12, wherein each of said first cam follower, second cam follower, first cam groove, and second cam groove comprises a plurality of first cam followers, second cam followers, first cam grooves, and second cam grooves, respectively provided at an equi-angular distance.

19. The zoom lens according to claim 18, wherein said linear guide slot comprises a plurality of linear guide slots, wherein said first guide projection and second guide projection respectively comprise a plurality of first guide projections and a plurality of second guide projections, respectively equal to the number of said plurality of linear guide slots, and wherein each of said first guide projections and corresponding one of said second guide projections are engaged with a common said linear guide slot of said guide slots.

20. The zoom lens according to claim 12, wherein said zoom lens is incorporated in a digital camera.

21. A zoom lens comprising:
- a cam barrel driven to rotate about an optical axis;
- a first cam groove and a second cam groove formed on an inner peripheral surface of said cam barrel, said first cam groove and second cam groove having different profiles;
- a first lens frame having a first cam follower which is engaged with said first cam groove; and
- a second lens frame having a second cam follower which is engaged with said second cam groove;
- a linear guide barrel which is associated with said first lens frame and said second lens frame so as to guide said first lens frame and said second lens frame in a direction of said optical axis;

wherein said first cam groove comprises:
- a first zoom section for moving said first lens frame between a telephoto position thereof and a wide-angle position thereof in accordance with a rotation of said cam barrel; and a first leading section for leading said first cam follower from a first cam follower insertion opening, which is open at an end of said cam barrel, to said first zoom section; and wherein said second cam groove comprises:
a second zoom section for moving said second lens frame between a telephoto position thereof and a wide-angle position thereof in accordance with said rotation of said cam barrel; and
a second leading section for leading said second cam follower from a second cam follower insertion opening, which is open at an end of said cam barrel, to said second zoom section;
wherein said first cam groove is formed so that said first cam follower insertion opening and said first zoom section are formed on opposite sides of said second zoom section in said direction of said optical axis; and
wherein said first leading section is formed on said first cam barrel to detour around an adjacent said second cam groove so as not to overlap said adjacent second cam groove.

22. The zoom lens according to claim 21, wherein said first cam follower, said second cam follower, said first cam groove, and said second cam groove respectively comprise a plurality of first cam followers, a plurality of second cam followers, a plurality of first cam grooves, and a plurality of second cam grooves, respectively provided at an equiangular distance.

23. The zoom lens according to claim 21, wherein said first cam groove further comprises a cam dead end positioned on the opposite side of said first zoom section with respect to said first leading section, said first cam follower not reaching said cam dead end during operation of said zoom lens, wherein said cam dead end of said first cam groove and said second cam follower insertion opening of said second cam groove are formed at the same circumferential position in a circumferential direction of said cam barrel, and wherein, upon assembly of said first lens frame and said second lens frame to said cam barrel and said linear guide barrel, said first cam follower is inserted into said first leading section via said first cam follower insertion opening, said linear guide barrel and said cam barrel are rotated relative to each other until said first cam follower reaches said cam dead end of said first cam groove, and subsequently, said second cam follower is inserted into said second leading section via said second cam follower insertion opening.

24. The zoom lens according to claim 23, wherein said linear guide barrel is positioned inside said cam barrel, said linear barrel comprising a linear guide slot extending parallel to said optical axis;

wherein said first lens frame comprises a first guide projection and said second lens frame comprises a second guide projection, said first guide projection and said second guide projection being engaged with a linear guide slot at different locations therein in said direction of said optical axis;

wherein said first guide projection is formed on said first lens frame at the same circumferential position as said first cam follower;

wherein said second guide projection is formed on said second lens frame at the same circumferential position as said second cam follower;

wherein said first cam follower is fitted in said first cam groove via said linear guide slot; and wherein said second cam follower is fitted in said second cam groove via said linear guide slot.

25. The zoom lens according to claim 24, wherein said first lens frame comprises a first resilient extending piece which extends in said direction of said optical axis to be elastically deformable radially inwards;

wherein said first guide projection is formed on said first resilient extending piece to extend radially outwards to be engaged with said linear guide slot;

wherein said first cam follower is fixed to said first guide projection to extend radially outwards to be engaged with said first cam groove via said linear guide slot;

wherein said second lens frame comprises a second resilient extending piece which extends in said direction of said optical axis to be elastically deformable radially inwards, wherein said second guide projection is formed on said second resilient extending piece to extend radially outwards to be engaged with said linear guide slot; and wherein said second cam follower is fixed to said second guide projection to extend radially outwards to be engaged with said second cam groove via said linear guide slot.

26. The zoom lens according to claim 24, wherein said linear guide slot comprises a plurality of linear guide slots, wherein said first guide projection and second guide projection respectively comprise a plurality of first guide projections and a plurality of second guide projections, respectively equal to the number of said plurality of linear guide slots, and wherein each of said first guide projections and corresponding one of said second guide projections are engaged with a common said linear guide slot of said linear guide slots.

27. The zoom lens according to claim 21, wherein said first cam groove further comprises a first accommodation section positioned between said first zoom section and said first leading section;

wherein said second cam groove further comprises a second accommodation section on the opposite side of said second zoom section with respect to said second leading section; and wherein said first accommodation section and said second accommodation section are positioned in the same range in a circumferential direction of said cam barrel.

28. The zoom lens according to claim 21, wherein said zoom lens is incorporated in a digital camera.

* * * * *